(12) United States Patent
Stenz

(10) Patent No.: US 11,753,988 B2
(45) Date of Patent: Sep. 12, 2023

(54) INTERNAL COMBUSTION ENGINE CONFIGURED FOR USE WITH SOLID OR SLOW BURNING FUELS, AND METHODS OF OPERATING OR IMPLEMENTING SAME

(71) Applicant: David L. Stenz, Wauwatosa, WI (US)

(72) Inventor: David L. Stenz, Wauwatosa, WI (US)

(*) Notice: Subject to any disclaimer, the term of this patent is extended or adjusted under 35 U.S.C. 154(b) by 0 days.

(21) Appl. No.: 17/297,319

(22) PCT Filed: Nov. 29, 2019

(86) PCT No.: PCT/US2019/063859
§ 371 (c)(1),
(2) Date: May 26, 2021

(87) PCT Pub. No.: WO2020/113168
PCT Pub. Date: Jun. 4, 2020

(65) Prior Publication Data
US 2022/0025813 A1    Jan. 27, 2022

Related U.S. Application Data

(60) Provisional application No. 62/872,760, filed on Jul. 11, 2019, provisional application No. 62/773,340, filed on Nov. 30, 2018.

(51) Int. Cl.
*F02B 45/08*    (2006.01)
*F01L 9/10*     (2021.01)
*F02G 1/02*     (2006.01)

(52) U.S. Cl.
CPC .............. *F02B 45/08* (2013.01); *F01L 9/10* (2021.01); *F02G 1/02* (2013.01)

(58) Field of Classification Search
CPC .......... F02B 45/00; F02B 45/02; F02B 45/04; F02B 45/08; F02B 45/10
See application file for complete search history.

(56) References Cited

U.S. PATENT DOCUMENTS

| 125,818 A | 4/1872 | Leopold |
|---|---|---|
| 145,123 A | 12/1873 | Otto |

(Continued)

FOREIGN PATENT DOCUMENTS

| CN | 101943054 | 1/2011 |
|---|---|---|
| CN | 109751149 | 5/2019 |

(Continued)

OTHER PUBLICATIONS

Moss, R. W., Roskilly, A. P., & Nanda, S. K. (2005). Reciprocating Joule-cycle engine for domestic CHP systems. Applied Energy, 80(2), 169-185.

(Continued)

*Primary Examiner* — John Kwon
(74) *Attorney, Agent, or Firm* — Amundsen Davis, LLC

(57) ABSTRACT

Internal combustion engines, including engines producing power from solid or slow burning fuel(s), such as biological-based or petroleum-based fuels, wood, corn, biomass, coal, and waste products, and/or possibly other liquid or gaseous fluids, as well as methods for operating or implementing such engines, are disclosed herein. In an example embodiment, the engine includes a crankshaft, a piston, a cylinder having an internal cavity and several ports, and an assembly having a chamber having a first region within which solid fuel can be situated and combusted. The assembly further includes a diverter valve so that, depending upon a setting of the valve and during engine operation, first and second amounts of compressed air respectively proceed to the first region and to bypass the first region, and a combination of combustion products and the second amount proceeds via one of the ports to the part of the internal cavity.

10 Claims, 8 Drawing Sheets

(56) References Cited

U.S. PATENT DOCUMENTS

| | | | |
|---|---|---|---|
| 178,023 A | 5/1876 | Otto |
| 343,875 A | 6/1886 | Weisz |
| 351,081 A | 10/1886 | Weiss |
| 479,651 A | 7/1892 | Lowne |
| 923,086 A | 5/1909 | Speirs et al. |
| 933,080 A | 9/1909 | Lake |
| 991,989 A | 5/1911 | Holm |
| 1,028,511 A | 6/1912 | Weisz |
| 1,356,578 A | 10/1920 | Wilson |
| 1,365,206 A | 1/1921 | Strong |
| 1,420,672 A | 6/1922 | Strong |
| 2,151,759 A | 3/1939 | Hardensett |
| 2,391,078 A | 12/1945 | Thomsen |
| 2,977,759 A | 4/1961 | Milliken |
| 3,285,001 A | 11/1966 | Turnblade |
| 3,886,734 A | 6/1975 | Johnson |
| 3,911,878 A | 10/1975 | Hofbauer et al. |
| 3,913,699 A | 10/1975 | Dyer |
| 3,937,012 A | 2/1976 | Zeh et al. |
| 3,945,777 A | 3/1976 | Labus |
| 3,963,390 A | 6/1976 | Labus |
| 3,969,899 A | 7/1976 | Nakazawa et al. |
| 3,986,484 A | 10/1976 | Dyer |
| 4,062,190 A | 12/1977 | Dawson |
| 4,129,003 A | 12/1978 | Smith, Jr. |
| 4,212,163 A | 7/1980 | Mikina |
| 4,224,798 A | 9/1980 | Brinkerhoff |
| 4,227,374 A | 10/1980 | Oxley |
| 4,242,591 A | 12/1980 | Harville |
| 4,261,169 A | 4/1981 | Zimmern |
| RE30,629 E | 6/1981 | Dawson |
| 4,271,669 A | 6/1981 | Keller et al. |
| 4,306,414 A | 12/1981 | Kuhns |
| 4,326,381 A | 4/1982 | Jensen |
| 4,341,070 A | 7/1982 | Clarke |
| 4,369,623 A | 1/1983 | Johnson |
| 4,455,826 A | 6/1984 | Knoos |
| 4,490,971 A | 1/1985 | Hedelin |
| 4,502,284 A | 3/1985 | Chrisoghilos |
| 4,599,859 A | 7/1986 | Urso |
| 4,653,269 A | 3/1987 | Johnson |
| 4,716,720 A | 1/1988 | Eickmann |
| 4,809,511 A | 3/1989 | Bajulaz |
| 5,074,110 A | 12/1991 | Singh |
| 5,109,666 A | 5/1992 | Eickmann |
| 5,263,316 A | 11/1993 | Shekleton |
| 5,341,637 A | 8/1994 | Hamrick |
| 5,355,679 A | 10/1994 | Pierce |
| 5,802,840 A | 9/1998 | Wolf |
| 5,822,994 A | 10/1998 | Belk et al. |
| 5,881,801 A | 3/1999 | Hayakawa et al. |
| 5,983,624 A | 11/1999 | Anderson |
| 6,032,460 A | 3/2000 | Pahl |
| 6,116,222 A | 9/2000 | Warren |
| 6,167,693 B1 | 1/2001 | Anderson |
| 6,301,872 B1 | 10/2001 | Anderson |
| 6,314,732 B1 | 11/2001 | Lookholder |
| 6,330,925 B1 | 12/2001 | Ovshinsky et al. |
| 6,336,317 B1 | 1/2002 | Holtzapple et al. |
| 6,418,708 B1 | 7/2002 | Mehail |
| 6,434,937 B2 | 8/2002 | Takamatsu |
| 6,463,731 B1 | 10/2002 | Warren |
| 6,481,197 B2 | 11/2002 | Anderson |
| 6,516,615 B1 | 2/2003 | Stockhausen et al. |
| 6,553,752 B2 | 4/2003 | Anderson |
| 6,557,655 B2 | 5/2003 | Ovshinsky et al. |
| 6,565,836 B2 | 5/2003 | Ovshinsky et al. |
| 6,715,313 B1 | 4/2004 | Takafu |
| 6,759,034 B2 | 7/2004 | Ovshinsky et al. |
| 6,820,706 B2 | 11/2004 | Ovshinsky et al. |
| 6,826,910 B1 | 12/2004 | Easton |
| 6,837,321 B2 | 1/2005 | Ovshinsky et al. |
| 6,880,324 B2 | 4/2005 | Tanaka |
| 6,935,109 B2 | 8/2005 | Goldfarb et al. |
| 7,104,061 B2 | 9/2006 | Hisanaga et al. |
| 7,134,270 B2 | 11/2006 | Tigane |
| 7,186,101 B2 | 3/2007 | Holtzapple et al. |
| 7,255,082 B2 | 8/2007 | Zajac et al. |
| 7,325,520 B2 | 2/2008 | Zajac et al. |
| 7,328,674 B2 | 2/2008 | Zajac et al. |
| 7,415,947 B2 | 8/2008 | Zajac |
| 7,415,948 B2 | 8/2008 | Zajac |
| 7,418,929 B2 | 9/2008 | Zajac |
| 7,421,995 B2 | 9/2008 | Zajac et al. |
| 7,424,871 B2 | 9/2008 | Zajac |
| 7,448,349 B2 | 11/2008 | Zajac |
| 7,481,189 B2 | 1/2009 | Zajac |
| 7,487,748 B2 | 2/2009 | Zajac |
| 7,552,703 B2 | 6/2009 | Zajac |
| 7,594,492 B2 | 9/2009 | Zajac |
| 7,624,574 B2 | 12/2009 | Sawada et al. |
| 7,658,169 B2 | 2/2010 | Zajac et al. |
| 7,748,351 B2 | 7/2010 | Zajac et al. |
| 7,748,352 B2 | 7/2010 | Zajac |
| 7,757,644 B2 | 7/2010 | Zajac |
| 7,765,785 B2 | 8/2010 | Kashmerick |
| 7,905,204 B2 | 3/2011 | Zajac |
| 7,937,943 B2 | 5/2011 | Cao |
| 8,109,074 B2 | 2/2012 | Rom |
| 8,191,350 B2 | 6/2012 | Negre et al. |
| 8,240,147 B2 | 8/2012 | Taba |
| 8,281,584 B2 | 10/2012 | Weber |
| 8,341,959 B2 | 1/2013 | Chae |
| 8,448,417 B1 | 5/2013 | Farber |
| 8,448,433 B2 | 5/2013 | McBride et al. |
| 8,522,545 B2 | 9/2013 | Tice |
| 8,539,763 B2 | 9/2013 | McBride et al. |
| 8,677,730 B2 | 3/2014 | Negre et al. |
| 8,806,866 B2 | 8/2014 | McBride et al. |
| 8,821,138 B2 | 9/2014 | Holtzapple et al. |
| 8,851,043 B1 | 10/2014 | Coney et al. |
| 8,893,499 B2 | 11/2014 | Maier |
| 8,908,820 B1 | 12/2014 | Reyes et al. |
| 8,935,921 B2 | 1/2015 | Tice |
| 8,997,475 B2 | 4/2015 | Ingersoll et al. |
| 9,046,054 B2 | 6/2015 | Thevenod |
| 9,046,055 B2 | 6/2015 | Mikalsen et al. |
| 9,140,208 B1 | 9/2015 | Shoffler |
| 9,188,000 B2 | 11/2015 | Rohs et al. |
| 9,222,360 B2 | 12/2015 | Bjerkan et al. |
| 9,234,480 B2 | 1/2016 | Gayton |
| 9,243,585 B2 | 1/2016 | Le Roux et al. |
| 9,291,122 B1 | 3/2016 | Fountain |
| 9,331,560 B2 | 5/2016 | Horton et al. |
| 9,382,872 B2 | 7/2016 | Holtzapple et al. |
| 9,416,702 B2 | 8/2016 | Hyde et al. |
| 9,488,128 B2 | 11/2016 | Sparkman |
| 9,534,560 B2 | 1/2017 | Coates |
| 9,759,157 B2 | 9/2017 | Miyairi et al. |
| 9,759,239 B2 | 9/2017 | Le Roux et al. |
| 9,765,786 B2 | 9/2017 | Korpela |
| 9,790,890 B2 | 10/2017 | Osborne |
| 9,797,339 B2 | 10/2017 | Evans |
| 9,920,706 B1 | 3/2018 | Yavid et al. |
| 9,945,321 B2 | 4/2018 | Vatne |
| 9,982,626 B2 | 5/2018 | Rabhi |
| 2007/0199299 A1 | 8/2007 | Kashmerick |
| 2011/0227339 A1 | 9/2011 | Rissacher |
| 2018/0163662 A1 | 6/2018 | Zhou |

FOREIGN PATENT DOCUMENTS

| | | |
|---|---|---|
| CZ | 301513 | 2/2010 |
| DE | 17049 | 4/1881 |
| DE | 163356 | 12/1903 |
| DE | 175155 | 2/1904 |
| DE | 102008028241 | 12/2009 |
| GB | 1244105 | 8/1971 |

(56) References Cited

FOREIGN PATENT DOCUMENTS

| GB | 1415463 | 11/1975 |
|---|---|---|
| GR | 20060100229 | 11/2007 |

OTHER PUBLICATIONS

Brzeski, L., & Kazimierski, Z. (1996). A New Concept of Externally Heated Engine Comparisons with the Stirling Engine. Proceedings of the Institution of Mechanical Engineers, Part A: Journal of Power and Energy, 210(5), 363-371.

Bell, M. A., & Partridge, T. (2003). Thermodynamic design of a reciprocating Joule cycle engine. Proceedings of the Institution of Mechanical Engineers, Part A: Journal of Power and Energy, 217(3), 239-246.

Lontsi, F., J. Castaing-Lavignottes, and P. Stouffs. "Dynamic simulation of a small Joule cycle Ericsson engine: first results." Proc. of the int. Stirling fomm 2008. ECOS GmbH Osnabrück, Germany, 2008.

PCT/US2019/063859 International Search Report and Written Opinion of the International Searching Authority dated Jul. 1, 2020 (14 pages).

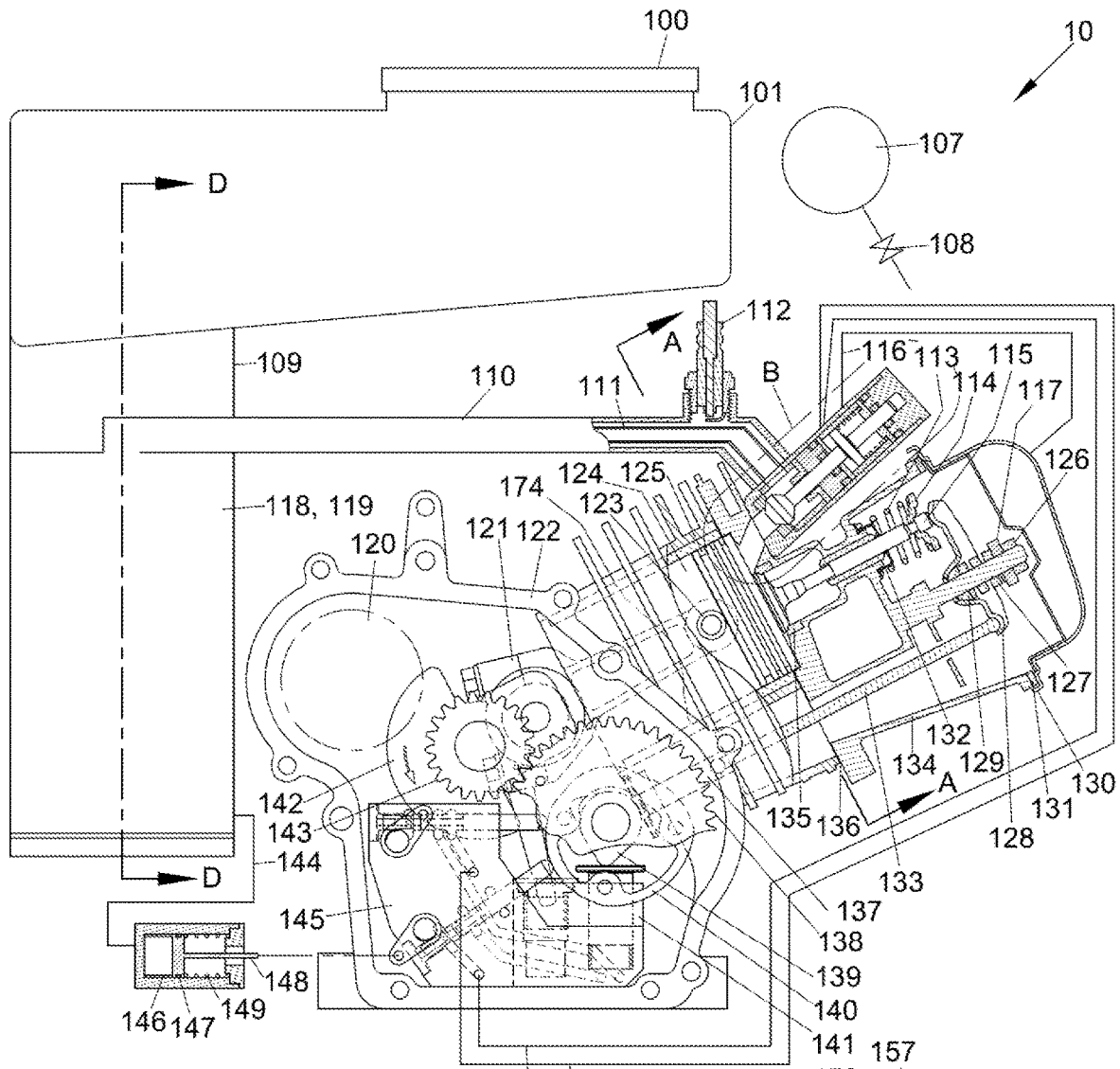
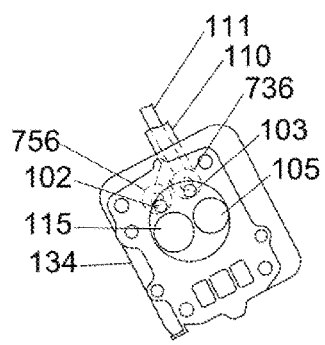
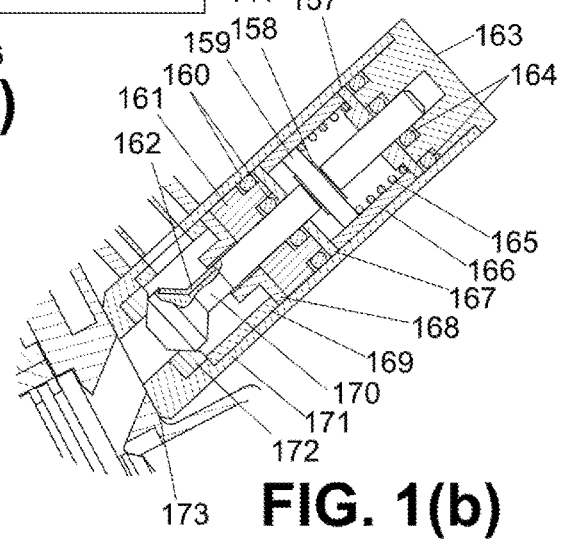
FIG. 1(a)
FIG. 1(c)
FIG. 1(b)

INTERNAL COMBUSTION ENGINE CONFIGURED FOR USE WITH SOLID OR SLOW BURNING FUELS, AND METHODS OF OPERATING OR IMPLEMENTING SAME

FIELD

The present disclosure relates to internal combustion engines and methods for operating or implementing such engines and, more particularly, to engines that produce power from solid or slow burning fuel(s), or from liquid or gaseous fuel(s), including for example biological-based or petroleum-based fuels(s), wood, corn, biomass, coal, or waste products, as well as to methods for operating or implementing such engines.

BACKGROUND

In the past tractors, trains, and ships were powered by solid fuels—such as coal and wood. Over time, with rare exception, these engines were displaced by internal combustion engines. In most cases, such internal combustion engines are smaller, lighter, economical, higher power, less complicated, and safer than such earlier (or other alternative) engines. In the world today, by estimate, there are billions of internal combustion engines in a great many applications, with most of those engines powered by fossil fuels that are in a processed, typically liquid (albeit sometimes gaseous), form. Solid fuel is only used commonly in large scale power plants and for home heating by those who have access to fire wood.

Notwithstanding the prevalence of internal combustion engines that utilize processed, liquid (or gaseous) fuels, solid fuels offer many advantages. These advantages include, for example, that many solid fuels are low in cost and abundantly available. Also for example, using wood or other biomass fuel has a zero carbon foot print. Wood from trees for example, drew carbon from the atmosphere for years as the trees absorbed solar energy as the trees grew. Using wood for fuel releases the carbon so other trees can use it to grow. Further for example, using solid fuels such as wood or other biomass fuel can be 100% recyclable and sustainable. Also for example, utilizing waste can be economically and ecologically advantageous, as such fuel may otherwise be land filled. Additionally for example, solid fuel is intrinsically safe compared to liquid or gaseous fuels.

Despite such advantages associated with various forms of solid fuel, unfortunately there has not been developed a practical internal combustion engine that can use solid fuel. Indeed, although various conventional combustion engines have been developed that can produce power from solid fuel(s), such conventional engines suffer from any of a number of disadvantages. For example, some such conventional engines that use solid fuels are bulky and complex, such as boilers and steam engines or steam turbines, and/or require converting the solid fuel(s) to liquid or gaseous forms prior to the engines being able to use (e.g., combust) those fuels. Also for example, some such conventional engines that use solid, liquid, or gaseous fuels may have high cycle temperatures, short combustion times, and combustion chamber shapes that produce undesirable emissions such as, for example, partially-burned hydrocarbons and nitrogen oxides.

In view of the above considerations, it would be advantageous if a new or improved engine, and/or method of operating or implementing such an engine, could be developed that would address one or more of the above-discussed problems or other problems associated with conventional engines, and/or would provide one or more other advantages by comparison with conventional engines.

SUMMARY

In at least one example embodiment, the present disclosure relates to an internal combustion engine. The engine includes a crankshaft, and a cylinder having a plurality of cylinder wall portions that define therewithin an internal cavity extending between a first internal end face of the first one of the cylinder wall portions and a second internal end face of a second one of the second cylinder wall portions. The engine further includes a piston positioned within the internal cavity of the cylinder, the piston including a piston head having a first side facing the first internal end face and a second side coupled at least indirectly to the crankshaft. The cylinder includes first, second, third, and fourth ports formed respectively at first, second, third, and fourth locations along the plurality of cylinder wall portions along a part of the internal cavity positioned between the first internal end face and the first side face. The engine additionally includes an assembly having a combustion chamber, an input port coupled at least indirectly to the first port, and an output port coupled at least indirectly to the second port, where the combustion chamber further includes a wall at least partly defining a first region of the combustion chamber within which solid fuel material can be situated and combusted. The assembly also includes first and second passageways therewithin, where the first passageway at least indirectly couples the input port with an input location of the first region, where the second passageway at least indirectly couples the input port with a second region in a manner that bypasses the first region, and where the second region is at least indirectly coupled with each of an output location of the first region and the output port. Additionally, the assembly further includes a diverter valve so that, depending upon a setting of the diverter valve and during an operation of the internal combustion engine, a first amount of compressed air exiting the part of the internal cavity via the first port proceeds via the input port and the first passageway to the first region, a second amount of the compressed air proceeds via the second passageway so as to bypass the first region, and a combination of combustion products exiting the first region and the second amount of the compressed air proceeds via the output port and the second port to the part of the internal cavity.

In at least one additional example embodiment, the present disclosure relates to a method of operating an internal combustion engine. The method includes moving a piston within an internal cavity of a cylinder so as to reduce a size of a part of the internal cavity between a first side of the piston and a first internal end face of the cylinder and thereby compress air within the region, and opening a first valve associated with a first port of the cylinder so as to allow the compressed air to proceed from the first port through a first conduit into a combustion chamber of an assembly by way of an input port of the assembly. Further, the method also includes directing a first portion of the compressed air received at the input port via a first passageway to a first region of the combustion chamber within which is situated solid fuel material, and directing, by way of a diverter valve having a setting determined at least indirectly by a first pressure within the combustion chamber, a second portion of the compressed air received at the input port via a second passageway so as to bypass the first region. Additionally, the method includes combusting at least a portion of the solid fuel material in response to the first portion of the compressed air being directed to the first region, so as to generate combustion products and combining, at a location apart from the first region, the combustion products and the second portion of the compressed air, so as to generate combustion chamber output products. Further, the method includes directing the combustion chamber output products from the output port via a second conduit to a second port of the cylinder, and additionally opening a second valve associated with the second port of the cylinder so as to allow the combustion chamber output products to enter the part of the internal cavity. Additionally, the method includes experiencing movement of the piston relative to the cylinder due to a second pressure applied by the combustion chamber output products upon the first side of the piston, where the movement of the piston at least indirectly causes rotation of a crankshaft of the internal combustion engine.

In at least one further example embodiment, the present disclosure relates to an internal combustion engine. The engine includes a crankshaft and a cylinder having a plurality of cylinder wall portions that define therewithin an internal cavity extending between a first internal end face of the first one of the cylinder wall portions and a second internal end face of a second one of the second cylinder wall portions. The engine also includes a piston positioned within the internal cavity of the cylinder, the piston including a piston head having a first side facing the first internal end face and a second side coupled at least indirectly to the crankshaft. The cylinder includes first, second, third, and fourth ports formed respectively at first, second, third, and fourth locations along the plurality of cylinder wall portions along a part of the internal cavity positioned between the first internal end face and the first side face. Further, the engine also includes an assembly having a combustion chamber, an input port coupled at least indirectly to the first port, and an output port coupled at least indirectly with the second port, where the combustion chamber further includes a wall at least partly defining a first region of the combustion chamber within which fuel material can be situated and combusted. Additionally, the engine also includes a first hydraulically-actuated valve associated with the cylinder and configured to govern whether a first fluid communication path exists between the part of the internal cavity and the input port via the first port, and a second hydraulically-actuated valve associated with the cylinder and configured to govern whether a second fluid communication path exists between the output port and the part of the internal cavity via the second port.

BRIEF DESCRIPTION OF THE DRAWINGS

FIG. 1(a) shows a partly-cross-sectional front elevation view of a new/improved internal combustion engine in accordance with a first example embodiment encompassed herein, in which the engine is a single cylinder engine with variable timing of compression and power valves, with solid fuel transferred via an airlock into a separate combustion chamber, and with starting being achieved by way of liquid fuel and spark.

FIG. 1(b) is a detail view of one of the compression and power valves of the first example embodiment shown in FIG. 1(a), corresponding to a region B in FIG. 1(a).

FIG. 1(c) is cross-sectional view of the cylinder head of the internal combustion engine of FIG. 1(a), taken along a line A-A of FIG. 1(a).

DETAILED DESCRIPTION

Figures 2A, 2B, 2C:
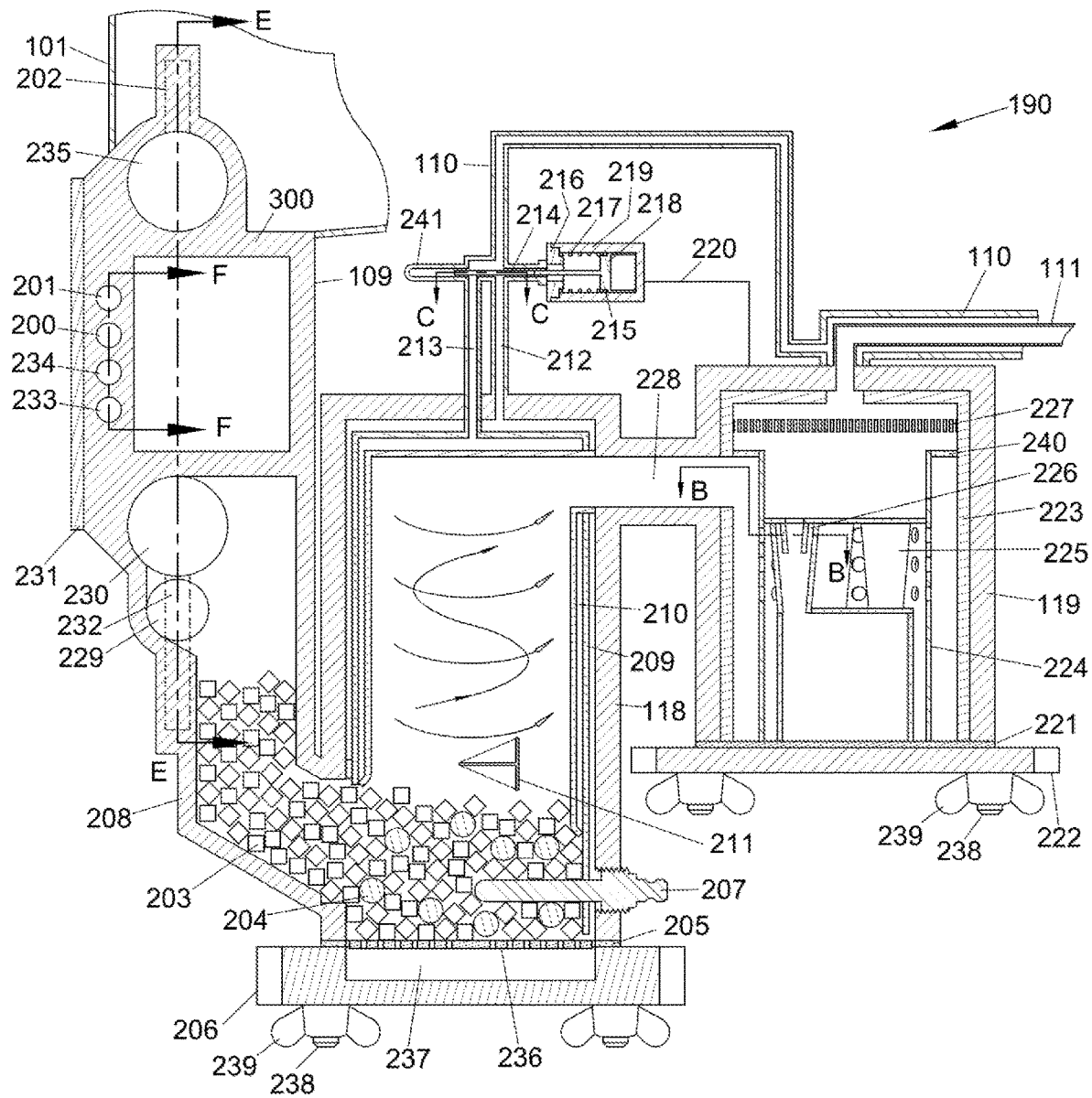
FIG. 2(a) is a cross-sectional view of the airlock, combustion chamber, and filters (collectively referred to as an airlock/combustion/filtering assembly) of the internal combustion engine of FIG. 1(a), taken along a line D-D of FIG. 1(a).
FIG. 2(b) is a cutaway, cross-sectional view, taken along a line B-B of FIG. 2(a), of inlet passage and cyclone filters of the internal combustion engine shown in FIG. 1(a).
FIG. 2(c) is a cross-sectional view, taken along a line C-C of FIG. 2(a), of a combustion control flow plate of the internal combustion engine shown in FIG. 1(a).

In at least some embodiments, the present disclosure relates to new and improved (new/improved) internal combustion engines that produce power from solid or slow burning fuel(s). In at least some such embodiments, the internal combustion engines are able to make use of such fuel(s) in common form. Further, in at least some such embodiments, the internal combustion engines operate by transferring the fuel(s) into special high pressure combustion chamber(s) that is or are configured to hold the fuel(s), separate solids from combustion products, with combustion controls and components to maintain pressure, and transfer that generated combustion products or gas to cylinders through special valves that are actuated and controlled by hydraulics.

In at least some such embodiments, the special high pressure combustion chamber(s) can include bypass features such that some compressed air is directed toward fuel within the combustion chamber to foster combustion, and other compressed air is diverted away from the fuel being combusted. Also, in at least some additional embodiments, the present disclosure also relates to new or improved internal combustion engines that produce power from liquid or gaseous fuel(s). In various embodiments of internal combustion engines encompassed herein, the solid or slow burning, or liquid or gaseous, fuel(s) that can be used by the engines can include for example any of a variety of biological-based or petroleum-based fuels(s), plastic, wood, corn, rice husks, biomass, coal, solid waste, or other waste products (including various combinations thereof and combinations with other matter), and including fuel(s) that are provided in various forms or having various shapes, sizes, and coatings.

Additionally, in at least one example embodiment of a new/improved internal combustion engine encompassed herein that is configured to utilize solid fuel, the engine include a combustion chamber that is separate from the compression and expansion devices (e.g., piston(s) and cylinder(s)), which compress intake air and receive combustion products and that deliver mechanical output power from the engine (e.g., by driving a crankshaft). Further, the engine includes, in relation to the combustion chamber, a transfer mechanism for transferring the (solid) fuel from ambient pressure to combustion chamber high pressure. In some embodiments, such a transfer mechanism can include an airlock, including possibly controls to cycle it (to feed fuel), as well as a pressure vessel (for loading, sealing, pressurizing), and a plunger (to push fuel in) and passage (to form a seal). In some cases, the solid fuel is transferred as a solid through an airlock, pressed through a constricting passage, or batch loaded into a high pressure capable chamber at when at lower pressure. It should be noted that, in a modified version of the engine that is suited for meltable (such as plastic) fuel, the engine can further include additional component(s) to hold fuel, and/or introduce air to fuel, and/or hold ash.

In this example embodiment of the new/improved engine, the combustion chamber can take any of a variety of forms that support/hold the fuel and permit air to be directed to the fuel for combustion to occur. Further, in this example embodiment of the new/improved internal combustion engine (whether suited for solid fuel and/or meltable fuel), the engine can also include filter(s) to isolate ash (which can help enhance the reliability/lifespan of the valves and pistons of the engine). Also, in this example embodiment of the new/improved internal combustion engine (whether suited for solid fuel and/or meltable fuel), the engine can include mechanism(s) to light fuel (e.g., during ignition at starting), such as manual activation, heater/glow plug(s), or liquid or gas fuel with spark ignition. The combustion chamber, airlock and pressure vessel, and filters (or filter assembly) can be formed as a single airlock/combustion/filtering assembly.

Further, in this example embodiment of the new/improved internal combustion engine (whether suited for solid fuel and/or meltable fuel), the engine can also include compression and power valves and associated actuation and control mechanisms, where the compression and power valves govern fluid communication between the aforementioned compression and expansion devices so as to allow compressed intake air to be provided to the combustion chamber and to allow combustion products and gases (e.g., exhaust) to be delivered from the combustion chamber to the compression and expansion devices. In this embodiment, the compression valve opening can be controllable related to combustion chamber pressure, so as to not over-compress the air, and as may be useful during start up when combustion chamber pressure is low. Also, in this embodiment, the power valve closing (or open time) can be controllable in a manner related to desired power output. The compression and power valves can take on particular designs, and operation of those valves can entail special valve actuation and control features, and/or hydraulic cam features.

Additionally, in this example embodiment of the new/improved internal combustion engine (whether suited for solid fuel and/or meltable fuel), the engine can also employ control features for governing or influencing combustion, combustion chamber pressure, and output power. By using solid (or meltable) fuel, there is usually (or always) excess or residual fuel within the combustion chamber beyond what is being combusted at any given instant (and, a given piece or portion of solid fuel may not be fully combusted for many cycles of operation of the compression and expansion devices of the engine). In the present embodiment, the combustion chamber is designed to allow for some compressed air entering the combustion chamber to bypass the region in which combustion is taking place, so as to slow (or speed up, or otherwise adjust) the rate of combustion. In at least some circumstances in which combustion chamber pressure is low, combustion is then controlled to be increased and, in at least some circumstances in which combustion chamber pressure is high, combustion is then controlled to be decreased. A design pressure for combustion chamber pressure of the engine can, further for example, take on a high value of above 300 psi.

Additionally, in regard to the aforementioned control features for governing or influencing combustion, in the present example embodiment, the controls can operate to build to and maintain pressure. Among other things, air flow per cycle can be set by initial density, displacement, and clearance volume. Also air flow and how much of it can be used in combustion can set the maximum volume of combustion products that can be produced and, further, a maximum open time of the power valve can be limited to that volume (that limit is maximum power). Power can be controlled directly by the time the power valve is open—further for example, this can be up to the maximum time (volume) outlined above or, for less power (in which case the power valve would close earlier), or for more power (in which case the power valve would close later).

The operation of the new/improved engines encompassed herein, in at least some embodiments, can be understood by starting with the operation of some conventional internal combustion engines and then describing the differences. Many conventional internal combustion engines operate in a manner involving four steps, those being:

1. Intake
2. Compression
3. Power
4. Exhaust

If a piston in a cylinder is the component that performs the compression and expansion in such a conventional engine, these steps can take place in one or two cycles of the piston within the cylinder—the former circumstance can be considered a 2 stroke (or cycle) engine and the latter circumstance can be considered a 4 stroke (or cycle) engine. In addition to the above, in such a conventional engine there are other steps involved. One is the introduction of the fuel. The fuel can be introduced into the intake air stream with a carburetor or injector, or the fuel can be injected into the cylinder. Additional steps are ignition and combustion. These take place during the compression and power steps.

Solid fuel has not been commonly used in these conventional engines because solids cannot practically be transferred into the cylinder either in the incoming air or by injection. The attempts that have been made usually use solid fuel that is very finely ground (to a powder) that will burn quickly and can be carried by an air stream. Solids cause problems with the valves—hindering their movement and not allowing them to close completely—and with the piston and cylinder, fouling the rings and clearance between the outside diameter of the piston and cylinder, scoring the cylinder walls, and jamming between the top of the piston and cylinder head. Solid fuels in non-powdered form (such as wood fuel pellets, dried corn, etc.) burn too slowly to complete combustion in the time available at the end of the compression stroke and beginning of the power stroke. The presence, accumulation, and removal of ash remaining after combustion would also cause problems in conventional engines.

In contrast with the above-described conventional engines, at least some of the embodiments of new/improved internal combustion engines encompassed herein are configured so that combustion takes place in a separate combustion chamber distinct from piston(s) and cylinder(s) within which compression and expansion occurs. (It should be noted that piston(s) and cylinder(s) can also be referred to as "compression and expansion devices" insofar as it is at the piston(s) and cylinder(s) that compression and/or expansion occur; additionally, it should be further understood that the present disclosure is intended to encompass embodiments in which other forms of compression and/or expansion devices are employed, at which compression and/or expansion occur, other than piston(s) and cylinder(s) including, for example, a Wankel engine rotor arrangement). The separate combustion chamber serves to contain the solid fuel at a location or region that is separate and distinct from the valves, piston(s), and cylinder(s), albeit the valves, piston(s), and cylinder(s) (or regions or locations therewithin) can at some times be in fluid communication with the combustion engine during operation of the engine. In contrast with the combustion chamber, the valves, piston(s), and cylinder(s) only handle gases, such as air and gaseous combustion products.

Given such a design (with examples of the above-described components and other components of such engines also being described below), such new/improved internal combustion engines operate on a new six-step cycle, the steps of which are:

1. Intake
2A. Compression
2B. Transfer to Separate Combustion Chamber
3A. Transfer from Separate Combustion Chamber
3B. Power (or Expansion)
4. Exhaust In this sequence of steps, the transfer steps 2B and 3A respectively are grouped together with (e.g., included or numbered along with) the compression and power steps 2A and 3B, respectively, because both of each of pair of grouped-together steps occur with a shared piston movement with the cylinder of the engine. More particularly, with respect to steps 2A and 2B (which can collectively be viewed as an overall step 2), each of these steps takes place during the piston movement that was step 2 in a conventional engine—that is, movement of the piston within the cylinder toward the cylinder head/valves. Also, with respect to steps 3A and 3B (which can collectively be viewed as an overall step 3), each of these steps takes place during the piston movement that was step 3 in a conventional engine—that is, movement of the piston within the cylinder away from the cylinder head/valves.

Notwithstanding this manner of classifying these steps, however, it should be appreciated that the steps 2B and 3A are nevertheless additional steps that arise in the new/improved engine due to the combustion occurring within a separate combustion chamber of the engine that is distinct from the piston(s) and cylinder(s) of the engine. Thus, notwithstanding this manner of description, the manner of operation of the new/improved engine described above should be understood truly as involving a six step cycle. Additionally, it should be further appreciated that the operation of such a new/improved engine in accordance with the above sequence of steps also entails the introduction of the fuel and combustion. These processes (or additional steps) are not listed above, insofar as the manners in which these processes are performed are very unique to the new/improved engine and will be described in further detail elsewhere in the present disclosure.

Figure 4A:
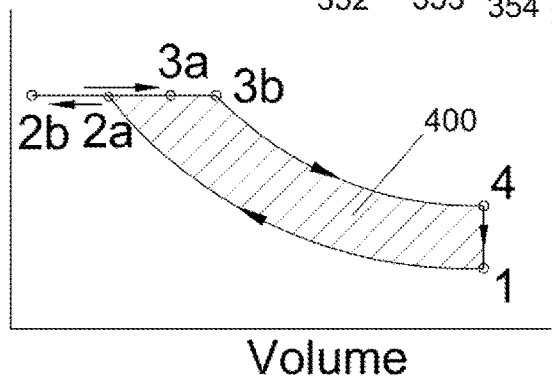
FIG. 4(a) is an idealized pressure-volume diagram representing idealized operation at full load of at least some new/improved internal combustion engines that are encompassed herein, including for example the engine of FIG. 1(a).

Referring now to FIG. 4(a), an idealized pressure-volume diagram is provided to illustrate the operation (in an ideal form) of at least some of the new/improved internal combustion engines encompassed herein, which differs from the idealized manners of operation of conventional internal combustion engines (such as diesel engines). The pressure-volume diagram of FIG. 4(a) particularly illustrates six states of operation that generally correspond to (in manners described below) the six steps of the cycle of operation of the new/improved engine described above. More particularly, the states shown on the pressure-volume diagram of FIG. 4(a) are as follows. First, the pressure-volume diagram shows a state 1, which corresponds to the end of the intake step 1 (which itself is not shown) and the beginning of the compression step 2A, at which the piston is moved maximally away from the cylinder head within the cylinder, such that there is maximum volume within the cylinder. Second, the pressure-volume diagram shows a state 2a, which corresponds to the end of the compression stroke of the piston within the cylinder and end of the compression step 2A, and the beginning of transfer (of compressed air) to the separate combustion chamber of the new/improved engine. Third, the pressure-volume diagram shows a state 2b, which corresponds to the end of the transfer to the separate combustion chamber and completion of the step 2B, at which there is minimum volume (between the piston and the cylinder head within the cylinder).

Fourth, the pressure-volume diagram next shows a state 3a, which corresponds to the end of the step 3A described above, and which also corresponds to the end of constant pressure combustion, and the end of transfer (e.g., of combustion products or gases) out of the separate combustion chamber back to the cylinder. Fifth, the pressure-volume diagram shows a state 3b, which represents the end of mixing, beginning of expansion associated with the power step 3B. Finally, sixth, the pressure-volume diagram shows a state 4, which corresponds to the end of the performing of the step 3B and the end of the expansion within the cylinder corresponding to the power step, and also the beginning of the exhaust step 4 (not shown). It should be recognized that, with respect to the pressure-volume diagram of FIG. 4(a), the pressure/volume changes associated with additional movements of the piston within the cylinder during the intake step 1 (movement of the piston away from the cylinder head so as to expand the internal volume with the cylinder) and during the exhaust step 4 (movement of the piston toward the cylinder head so as to reduce the internal volume), which would occur in the circumstance where the engine is a four stroke engine, are not shown (however, such additional movements would not be needed in the circumstance where the engine was a two stroke engine).

In view of FIG. 4(a), it should be recognized that the new/improved engine takes in air, compresses it and any residual gases in the cylinder (just referred to as air hereafter), transfers it to a high pressure combustion chamber (or chambers) where some or all of the air combusts with fuel. The engine transfers high pressure combustion products out of the combustion chamber after they are filtered and expands them to power the engine and produce useful power. State 1 is after step 1 (intake) when the piston is at the bottom of its stroke, at maximum volume. The pressure is low. Compared to the high pressure of the cycle, it is near atmospheric pressure (above or below atmospheric depending upon how air is charged into the piston/cylinder). State 2a is after step 2A (compression) when the piston/cylinder has compressed the air to the pressure of the combustion chamber. Note that the clearance volume above the piston at the end of its stroke should be minimized. There is no combustion chamber above the piston. Upon attaining the state 2a, a valve opens and the high pressure air can then be transferred out of the cylinder in accordance with the step 2B to the separate combustion chamber of the engine (thus, FIG. 4(a) shows a progression from state 2a to state 2b). This valve, which governs coupling between the cylinder interior and the separate combustion chamber, is referred to herein as a compression valve, and is discussed further below. When the piston with the cylinder has reached its top dead center position, such that there is minimum volume within the cylinder (between the piston and the cylinder head), the compression valve closes.

At this time (and particularly when or after the compression valve closes), an additional valve, referred to herein as a power valve, opens (in one example embodiment, each of the power valve and the compression valve can be a respective poppet valve). As the piston moves away from its top dead center position, combustion products are transferred, in accordance with the step 3A described above, into the cylinder (thus, FIG. 4(a) shows a progression from the state 2b to the state 3a). At a controlled variable time, the power valve closes. The air that remained in the cylinder at the state 2b is mixed and heated by the combustion products, and the state 3b particularly represents the time at which that mixture is ready for expansion. The mixture is then expanded, in accordance with step 3B, to the maximum volume of the cylinder, at which the state 4 shown in FIG. 4(a) is attained. The mixture is exhausted in accordance with the step 4 described above (the exhaust step) and, when fresh air is charged into the cylinder in accordance with the step 1 described above (the intake step), the cycle repeats.

Figure 4B:
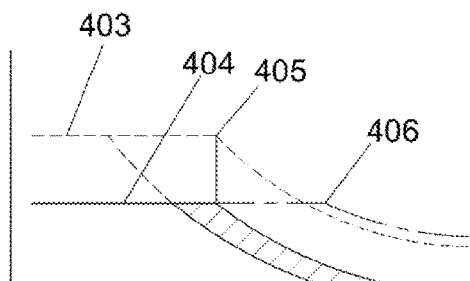
FIG. 4(b) is an idealized pressure-volume diagram representing idealized operation at less than design pressure of at least some new/improved internal combustion engines that are encompassed herein, including for example the engine of FIG. 1(a).
Figure 4C:
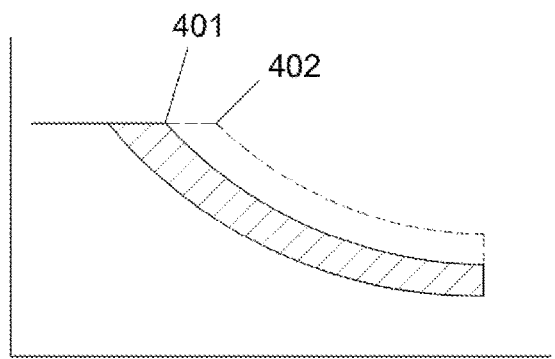
FIG. 4(c) is an idealized pressure-volume diagram representing idealized operation at less than full load of at least some new/improved internal combustion engines that are encompassed herein, including for example the engine of FIG. 1(a).

As will be described in further detail, in at least some embodiments of the new/improved engines encompassed herein, the engine includes controls that work to build the pressure within the separate combustion chamber of the engine to a high level and to maintain that pressure. FIG. 4(a) is the ideal cycle operating at full design power (and pressure). The power or work delivered per cycle is an area 400 inside the diagram (shown with cross-hatching). By comparison, FIG. 4(b) is an additional idealized pressure-volume diagram that shows the ideal cycle when the new/improved engine is operating at a lower than design pressure, which can occur for example during startup of the engine. Further, FIG. 4(c) is an additional idealized pressure-volume diagram that shows the ideal cycle when the new/improved engine is operating at design pressure but less than full load.

More particularly with respect to the pressure-volume diagram of FIG. 4(b), it should be appreciated that the diagram not only illustrates operation at a lower than design pressure, but also illustrates (for comparison purposes) the design full power cycle corresponding to that of FIG. 4(a), which is shown by way of a dashed line. In a situation where the engine is operating at the full design power (as represented by the dashed line in FIG. 4(b)), the intake step (not shown) and compression are designed to deliver the maximum amount of air at the highest pressure within the limits of displacement and clearance volume above the piston in the cylinder at state 2b (see also FIG. 4(a)). The cycle's maximum pressure, shown as a design pressure 403, positively relates to thermal efficiency and power. The air delivered to the combustion chamber when converted to the design maximum amount of combustion products will produce a specific mass of gases. Those gases will occupy a higher volume when at lower pressure and a lower volume when at a higher pressure. The power valve is design limited to close no later than the volume at state 3a (see also FIG. 4(a)).

However, if the combustion chamber is below the full design pressure 403 and instead is operating at a lower-than-design pressure 404 as shown in FIG. 4(b), the combustion products produced will occupy a larger volume 406 than the volume at the limit the power valve remains open (shown as a volume 405). This means with each cycle more combustion products are produced than removed, therefore driving the engine to build up to the design pressure 403 (again, power generation is shown, in FIG. 4(b) for the lower-than-design pressure manner of operation, as a cross-hatched region).

As will be described in further detail below, in at least some embodiments of new/improved engines encompassed herein, combustion is regulated by bypassing air around the fuel in the combustion chamber or injecting less fuel in the case of liquid and gaseous fuel engines (see FIG. 6). If the combustion chamber pressure is below design operating pressure, less air is bypassed producing more combustion, or more fuel injected in the case of liquid and gaseous fuel engines. If combustion chamber pressure is at or above design operating pressure, more air is bypassed resulting in less combustion, or less fuel injected in the case of liquid and gaseous fuel engines. In general, operation of the engine is controlled to drive the combustion chamber to operate towards its design pressure. Additionally, it should also be appreciated that the power output per cycle is directly adjusted by changing the volume at which the power valve closes. Specifically with reference to FIG. 4(c), in the case of the engine operating a design pressure but less than full (part) load, the power generated from operation of the engine again is shown (as with FIG. 4(a) and FIG. 4(b)) as a cross-hatched region 401. By comparison, FIG. 4(c) also shows, by way of a dashed line 402, how the power generated from operation of the engine would increase (to encompass more area than the region 401) when the engine was shifted from operating at less than full load to full load. Thus, the region 401 represents a part load circumstance and the region 402 represents a full load condition. It should be apparent, therefore, that controlling closing of the power valve can change the area hatched from a small sliver at idle to full area at full power. It should also be appreciated that control of combustion, combustion chamber pressure, compression and power valve timing, and power output along with other components of a particular embodiment may be controlled in any combination and is not limited to the particulars of any one embodiment described herein.

It should be appreciated that the idealized model for operation of at least some embodiments of the new/improved engines encompassed herein, as illustrated by the pressure-volume diagrams of FIG. 4(a), FIG. 4(b), and FIG. 4(c), is intended to aid in understanding the operation of the such new/improved engines. However, it should also be recognized that the pressure-volume diagrams shown in FIG. 4(a), FIG. 4(b), and FIG. 4(c) are idealized representations and only approximate real-world operation of such new/improved engines encompass herein (similar to how the constant volume "Otto" cycle is often employed to illustrate operation of a conventional spark ignition engine and the constant pressure "Diesel" cycle or limited pressure cycle are often employed to illustrate a conventional compression ignition engine).

Further with respect to FIG. 4(a), FIG. 4(b), and FIG. 4(c), other than during start up, the combustion chamber in the new/improved engine can be maintained at a high pressure—such as 300 psi. The cycle's high pressure is modeled as constant because the volume of the combustion chamber is large compared to the volumes transferred in and out by each cycle of the piston/cylinder. Also it should be noted that, when an amount of air is transferred to the combustion chamber and burns with fuel, the resulting hot combustion product gases will occupy more volume at the same pressure. This is why, as shown in FIG. 4(a), the distance between the state 2b and the state 3a (the 2b to 3a line) is longer than the distance between the state 2a and the state 2b (the 2a to 2b line).

It should further be appreciated that, during actual operation of the new/improved engine, the pressures will not be the ideal constant. The combustion chamber pressure may vary depending on operation and design. For example, in one embodiment or circumstance, it is possible that the new/improved engine can operate as follows. Assuming that the combustion chamber is at 300 psi initially (e.g., prior to the transfer associated with step 2B), the air in the piston/cylinder may rise to 320 psi to motivate the flow to the combustion chamber (e.g., during the transfer associated with the step 2B). As the air enters the combustion chamber and reacts with fuel, the pressure within the combustion chamber may rise slightly. Then, as the piston starts its downward stroke, the pressure in the piston/cylinder may drop to 280 psi to motivate the flow out of the combustion chamber.

Referring now to FIG. 1(a), a new/improved internal combustion engine 10 in accordance with one example embodiment encompassed herein is illustrated. It should be noted that, in FIG. 1(a), the engine 10 is shown with a side cover removed so as to reveal certain internal components of the engine (albeit, during operation, the side cover would be assembled as part of the engine). As shown, the engine 10 in this example embodiment is a single-cylinder engine having a piston 124 within a cylinder 174. It will be appreciated that the cylinder 174 includes a plurality of cylinder wall portions that define therewithin an internal cavity extending between a first internal end face of the first cylinder wall portion and a second internal end face of the second cylinder wall portion. Also, the piston 124 is positioned within the internal cavity of the cylinder 174, and the piston includes a piston head having a first side facing the first internal end face of the first cylinder wall portion and a second side coupled at least indirectly to a crankshaft 142. Also as shown, the engine 10 includes a crankcase 122, a cylinder head 134, and a connecting rod 121. The view provided in FIG. 1(a) is a partly-cross-sectional view, with the engine 10 being partially sectioned through a piston bore of the piston 124 that is positioned within a cylinder 174. Due to the orientation of the engine 10, an intake valve 115 of the engine is also visible (as discussed below in regard to FIG. 1(c), an exhaust valve 105 is also present). Although valve components associated with the valve 115 are shown in cross-section, the piston 124 and valve 115 (or valve 105) are not being sectioned.

Although the engine 10 is a new/improved internal combustion engine, the crankcase 122, cylinder head 134, crankshaft 142, and connecting rod 121 can, depending upon the embodiment, be identical to or substantially similar to, or different from, those found in a conventional gasoline-powered internal combustion engine. In the present example embodiment, the crankcase 122, cylinder head 134, crankshaft 142, and connecting rod 121 particularly have been modified to increase the stroke of the piston 124 and overall minimize clearance volume above the piston. This both allows the pressure of a combustion chamber 118 of the new/improved engine 10 to be higher and more air to be transferred out of the cylinder 174. A higher cycle (e.g. combustion chamber) pressure increases efficiency of the engine 10, and higher pressure and air flow increases possible power output. It will further be noted that a wrist pin 123 connects the piston 124 to a connecting rod 121, which in turn can drive (e.g., by way of a crankpin) rotation of a crankshaft 142 of the engine 10. Additionally, piston rings 125 form a seal between the piston 124 and the cylinder 174.

In the accordance with the present example embodiment of FIG. 1(a), the new/improved internal combustion engine 10 in one sense remains a "4 cycle" engine, in that operation of the engine involves movements of the piston 124 back and forth within the cylinder 174 that entail each of intake, compression, expansion, and exhaust strokes. These movements of the piston 124 respectively correspond to the steps 1, 2a, 3b, and 4 described above. Further, to allow for outside air to enter the cylinder during the intake stroke, and allow for exhaust to be emitted from the cylinder during the exhaust stroke, the engine 10 includes the intake and exhaust valves 115 and 105 (see FIG. 1(c), respectively. It will be appreciated that each of the intake valve 115 and exhaust valve 105 is actuated by a respective cam, pushing tappet, push rod, and rocker arm. In this regard, FIG. 1(*a*) particularly shows a cam 139, a pushing tappet 137 and a push rod 133, pushing against a rocker arm 128, for actuating the intake valve 115, albeit it should be recognized that substantially identical components (though not shown in FIG. 1(*a*)) are provided to allow for actuation of the exhaust valve 105. In this embodiment, the cam 139 (as well as the corresponding cam associated with the exhaust valve 105) is driven at half the rotational speed of the crankshaft 142, by gears 143 and 138.

As already noted, the cylinder head 134 (and valve components) is sectioned through the center line of the intake valve 115 (alternatively, it could be supposed that the valve shown in FIG. 1(*a*) is the exhaust valve). However, even though the exhaust valve 105 is not shown in FIG. 1(*a*), it will be appreciated that the exhaust valve is situated in the cylinder head 134 and the engine 10 in a manner similar to that of the intake valve 115 as shown in FIG. 1(*a*). More particularly in this regard, FIG. 1(*c*) provides a cross-sectional view of the cylinder head 134, taken along a line A-A of FIG. 1(*a*). In this view, both the intake valve 115 and the exhaust valve 105 are shown, and additionally it can be seen that the cylinder head 134 also includes a power valve port 102 and a compression valve port 103.

It should further be appreciated from FIG. 1(*a*) that the engine 10 additionally includes a head gasket 136, a valve cover assembly with a crankcase breather 130 and an associated gasket 131, a pivot bushing 129 retained by jam nuts 117 and 126, a spring retainer 114, a valve spring 113, a valve seal 132, and a valve seat 135. Also in the present embodiment, because of the small clearance between the piston 124 and valve 115, a heavy spring 127 has been added to the rocker arm assembly associated with the intake valve 115. Under normal operation, the heavy spring 127 should not deflect but, if timing is off due to wear or misassembly, engine component damage may be avoided by deflection of the spring 127. As shown in FIG. 1(*a*), several of these components (e.g., the pivot bushing 129, the jam nuts 117 and 126, the spring retainer 114, the valve spring 113, the valve seal 132, the valve seat 135, and the heavy spring 127) are particularly associated with the intake valve 115 and actuation of that valve. Nevertheless, although not shown in FIG. 1(*a*) (or FIG. 1(*c*)), it should further be appreciated that the engine 10 additionally includes counterpart ones of the pivot bushing 129, the jam nuts 117 and 126, the spring retainer 114, the valve spring 113, the valve seal 132, the valve seat 135, and the heavy spring 127 in association with the exhaust valve 105 in substantially the same manner as those components are provided in association with the intake valve 115 (although only one component is numbered and referenced, such as the valve spring 113, each component is duplicated between the intake and exhaust valves, and between the compression and power valves described further below).

Additionally with respect to the new/improved internal combustion engine 10, it should be appreciated that the engine in the present embodiment can be constructed so as to include some additional components of a gasoline-fueled spark-ignited engine that are not shown in FIG. 1(*a*), FIG. 1(*b*), or FIG. 1(*c*). In particular, although not shown in FIG. 1(*a*), FIG. 1(*b*), and FIG. 1(*c*), it should be appreciated that, in the present embodiment, the engine 10 can employ an intake arrangement (including for example an intake port, intake passage, and/or intake valve), an exhaust arrangement (including for example an exhaust port, exhaust passage, and/or exhaust valve), a carburetor, and a muffler, and all of these components can (but need not) be connected and operate as in a conventional manner.

Further in this example embodiment, the new/improved internal combustion engine 10 is constructed by adding numerous components/features to several components obtained and in some cases modified from a conventional small spark ignited gasoline engine, and is configured to run on wood pellets. In particular, the components/features of the new/improved internal combustion engine 10 that have been added include the combustion chamber 118, which is a separate high pressure combustion chamber, as well as filters 119, an airlock 109 and associated controls (described further below), and a compression valve 756 (see FIG. 1(*c*) and FIG. 7) a power valve 736 (see FIG. 1(*c*) and FIG. 7) and associated controls (described further below). Further as shown in FIG. 1(*a*), a solid fuel hopper 101 with a filling opening and cover 100 holds fuel for the airlock 109, which feeds fuel into the combustion chamber 118 (FIG. 2 provides additional details regarding the airlock, combustion chamber, and filters 119).

As will be described further below, opening and closing of the compression valve 756 and power valve 736 permit fluid coupling between the combustion chamber 118 and the interior of the cylinder 174. In this regard, it should particularly be appreciated that, during step 2B of operation of the engine 10, air (e.g., compressed air) is transferred particularly from the cylinder 174, through the compression valve 756 and further by way of a transfer pipe 110 linking the compression valve with the combustion chamber 118, to the combustion chamber. Additionally, during step 3A of operation of the engine 10, combustion products (e.g., combustion gases) and bypassed air (bypassed within the combustion chamber) are transferred particularly to the cylinder 174, by way of a transfer pipe 111 linking the power valve 736 with the combustion chamber 118 and further through the power valve, from the combustion chamber 118. FIG. 1(*c*) further shows (in dashed lines or phantom) how the transfer pipe 110 is linked to the compression valve 756 and the transfer pipe 111 is linked to the power valve 736.

Referring now additionally to FIG. 1(*b*), one of the compression valve 756 and power valve 736 (see FIG. 7) of the new/improved internal combustion engine 10, corresponding to a region B of FIG. 1(*a*), is shown in more detail. Because the compression valve 756 had power valve 736 are aligned with one another from the viewpoint of FIG. 1(*a*), only one of those two valves is visible in FIG. 1(*a*). Nevertheless, it should be recognized that view provided in FIG. 1(*b*) is equally representative of either the compression valve 756 or the power valve 736 of the engine 10, as both of those valves are present within the engine 10 and have identical or substantially identical arrangements relative to the cylinder head 134. Accordingly, for purposes of the discussion regarding FIG. 1(*b*), the valve arrangement shown therein will be considered to be representative of either the compression valve 756 or the power valve 736.

As shown in FIG. 1(*b*), the valve shown (again, either the compression valve 756 or the power valve 736) has a valve body (or housing) 171, a housing valve stem 170, an insulating insert 162, a valve seat 172, an insulating sleeve 169, an insulating cap 168, a valve guide 161, seals 160 and 164, a seal retainer 167, a piston 159, retaining clips 158, a cylinder 166, a valve spring 165, a valve cap 163, a seal retainer and spring guide 157, and a gasket 173. Pressure is balanced on the valve stem 170 by combustion chamber pressure being admitted to the bore in the valve cap 163 via a passage not shown, possibly in the valve stem itself.

Further with reference to FIG. 1(a), the valve piston 159 and cylinder 166 are respectively connected to respective control valves (not shown). When the respective control valves send oil pressure, the respective valves open. Lines 155 and 156 respectively connect the respective control valves (not shown) to respective valve actuators. The respective valves close when the respective lines are opened by the respective control valves and oil returns through the same respective lines.

It should be noted that the respective pistons 159 of the compression valve 756 and power valve 736 (again, one of which is shown by example in FIG. 1(b)) do not have seals. The action of opening, dwell, and closing occurs over short time intervals such that leakage will not affect operation, but leakage allows for bleeding air from the piston. Additionally, leakage oil cools and lubricates each valve and is drained back to the crankcase 122 and may be drained into the rocker arm enclosure to aid the lubrication and/or cooling of the components therewithin (e.g., the rocker arm assembly), this being done through a line 116. Additionally it should also be noted that, notwithstanding the above description according to which the compression valve 756 or the power valve 736 are identical or substantially identical, in some alternate embodiments insulating elements such as the insulating sleeve 169, the insulating cap 168, and the insulating insert 162 may be omitted from the compression valve due to the compressed air being at a much lower temperature than the combustion products going through the power valve.

Given this arrangement, the operations of the engine 10 shown in FIG. 1(a), FIG. 1(b), and FIG. 1(c) in accordance with the six-step cycle described above (including the steps 1, 2A, 2B, 3A, 3B, and 4 described above), can be further appreciated. In particular, the operational cycle of the engine 10 starts with the piston 124 at the minimum cylinder volume position, namely, the top dead center position. As the crankshaft 142 rotates a half revolution through the cycle's first step (the intake step), the cam 139 opens the intake valve 115, thus allowing the increasing volume in the cylinder 174 to draw in air. Subsequently, as the crankshaft 142 rotates another half revolution, the intake valve 115 closes and the piston 124 compresses the air. The transfer of the compressed air to the combustion chamber 118 occurs at the latter stage of the upward stroke of the piston 124, and is controlled by the compression valve 756 (see FIG. 7) and its controls. The compression valve 756 particularly should open when the air is compressed to (or above) the pressure of the combustion chamber 118.

Further, as the crankshaft 142 begins to rotate another half revolution, filtered combustion products and bypassed air are transferred back into the cylinder 174 via the power valve 736. At a controlled variable time, the power valve 736 closes. The air that remained in the cylinder 174 and the combustion products mix and are expanded, producing power. Then, as the crankshaft 142 rotates another half revolution, the cam 139 opens the exhaust valve 105 and the mixture is exhausted (step 4). After exhaust, the expelled mixture may go thru pollution control devices. At this point, fresh air is charged into the cylinder 174 again, and the cycle repeats.

In addition to the above-described features, in the present embodiment the new/improved internal combustion engine 10 includes additional features that facilitate starting of the engine. Still with reference to FIG. 1(a) (and FIG. 1(b) and FIG. 1(c)), the engine 10 particularly includes spark generating components including a spark plug 112. In the present embodiment, the spark plug 112 is mounted in the transfer pipe 110 to allow liquid fuel starting of the engine. Liquid fuel from a tank 107 is supplied to the carburetor (not shown) through a valve 108. During starting, the carburetor supplies fuel to the induced (intake) air. The air and fuel are compressed and transferred out of the cylinder 174 and ignited by the spark plug 112. In this circumstance, combustion occurs in the fuel air mixture where it is present, both in the cylinder 174, the transfer pipe 110, and combustion chamber 118. This starting combustion will allow the engine 10 to build pressure in the combustion chamber 118 towards its normal operating pressure and will also ignite the solid fuel in the combustion chamber. To achieve this manner of starting of the engine 10, the timing of sparking provided by the spark 112 can vary depending upon the embodiment, and may be similar to or different from the timing of sparking utilized in some conventional engines.

It should also be appreciated that, when the solid fuel is burning (e.g., during normal operation of the engine 10 rather than during starting), the fuel to the carburetor is shut off by the valve 108, and the engine will run only on the fuel in the combustion chamber 118. That shut off can be done manually, or otherwise controlled, possibly by feedback from the combustion chamber 118 indicating that the solid fuel is burning, such as the temperature of the combustion chamber. As mentioned above, the pipe 111 allows transfer of combustion products and bypassed air from the combustion chamber 118 to the power valve 736 and then the cylinder 174. In the present embodiment, the pipe 111 is jacketed by the pipe 110 as illustrated (in phantom) in FIG. 1(c), which allows the cooler transferred (e.g., compressed intake) air that passes through the pipe 110 to cool the pipe 111. The gases in the pipes 110 and 111 are at a high pressure, so the pipe 110 is heavy enough to contain that pressure. Also, the pressure difference between the gases in the pipes 110 and 111 is small. Thus, the pipe 111 may be treated more as a conduit than a pressure vessel. Further, in at least some embodiments, the pipes 110 and 111 can have added features to allow for thermal expansion such as curves, loops, or corrugations, and internal or external insulation may also be added (not shown). In light of the high pressure carried by the pipes 110 and 111, compression-type fittings (not shown) can be used at their joints. The pipes 110 and 111 are not limited to the concentric design shown. In other embodiments, the pipes may be separate or any mechanism or manner of connecting the compression and power valves to the combustion chamber, and/or pressure vessel, and or combustion control mechanism, and or the filters, can be employed.

Further in regard to the new/improved internal combustion engine 10 shown in FIG. 1(a), at starting or if the combustion chamber is below its design operating pressure, the compression valve 756 should be controlled to open early such that the transfer of air (state 2A to 2B as described above) can start when the pressure within the cylinder 174 is close to the pressure within the combustion chamber 118. Such control is performed, in the present embodiment, by way of a compression valve opening timing control cylinder 146 and a compression valve opening timing control piston 148 situated within that cylinder. As shown, the timing control piston 148 (more particularly, an interior region within the cylinder 146 having a size determined by the timing control piston) is connected to the combustion chamber 118 by way of a line 144, and thus is coupled to/exposed to the combustion chamber pressure. The timing control piston 148 additionally has a seal 147 and acts against a spring 149 in the cylinder 146. The timing control cylinder 146 and timing control piston 148 associated therewith adjusts the opening timing of the compression valve 756 by way of a timing lever (see FIG. 5).

Notwithstanding the above-described embodiment of the new/improved internal combustion engine 10, the present disclosure is intended to encompass numerous other embodiments as well that have one or more other features that are different from, or in addition to, those described above. In one example alternate embodiment, a new/improved engine would be identical or substantially similar to the new-improved engine 10 of FIG. 1(*a*), except insofar as the fuel hopper and airlock would be replaced by a pressure vessel being filled with fuel when the engine is not running and that vessel would be at atmospheric pressure. This pressure vessel could be integral with the combustion chamber and filter pressure vessels. This embodiment may offer economical advantages for small engine applications. The airlock model may be more suited for larger multiple cylinder engine embodiments consuming larger quantities of fuel.

Referring now to FIG. 2(*a*), the airlock 109, combustion chamber 118, and filters 119, along with combustion control features, of the new/improved internal combustion engine 10 of FIG. 1(*a*) are shown in more detail. Collectively, these structures can also be referred to as a combination airlock/combustion/filtering assembly 190, and an outer housing of all of these structures in the present embodiment can be considered a pressure vessel. In this assembly 190, solid fuel 203 in the hopper 101 passes into the airlock 109 when a low pressure door (LPD) 235 is open. A high pressure door (HPD) 230 is normally closed. To achieve desired combustion operation, the combustion chamber 118 includes a trigger 229 and several airlock control valves and associated switches. The airlock control valves and sequence of operation will be described more in FIG. 3. Position of the trigger 229 starts the sequence. Valves control this sequence, such as a LPD switch 202, a low pressure vent (LPV) 200, a low pressure switch (LPS) 201, a high pressure switch (HPS) 234, a high pressure vent (HPV) 233, and a high pressure door switch 232 together with passages in an airlock body (or pressure vessel) 300 and grooves covered by a plate 231 that connect these components with each other, atmosphere, the combustion chamber, and the airlock interior (it should be recognized that the bores holding the valves are shown in FIG. 2(*a*), but the components to retain and seal these bores are not shown).

Further as shown in FIG. 2(*a*), a passage 208 transfers the fuel 203 from the airlock 109 to the combustion chamber 118. Although not shown, the internal fuel burning configuration of the combustion chamber 118 in at least some embodiments can be similar to some conventional solid fuel burning appliances such as grills, heater, furnaces, boilers, etc. Air and fuel flow within the combustion chamber 118 can be upward, downward or horizontal. An auger or sweeper may be employed in the combustion chamber 118 to prevent fouling of the combustion chamber by solid combustion products and moving of fuel. The combustion chamber 118, filters 119 (if present), and pressure vessel may be any shape or size to accommodate specific fuels and a particular embodiment. The passage 208 also serves as a reserve of fuel to continually feed the fuel into the combustion zone.

Additionally as shown in FIG. 2(*a*), the combustion chamber 118 in the present embodiment also includes a heater or glow plug 207 that can provide heat within the combustion chamber. The heater or glow plug 207 may be used together with (or, in some embodiments, instead of) the carburetor and spark plug starting. In alternate embodiments, a flame igniter can be used in place of the heater or glow plug 207. Further, the combustion chamber 118 also has a pressure vessel cleanout door 206 with a seal 205. Also, in addition to including an outer combustion chamber housing (which also can be considered a pressure vessel) that is particularly pointed to by the reference numeral 118 as shown in FIG. 2(*a*), the combustion chamber 118 further includes a first internal liner (or wall) 209, and a second internal liner (or wall) 210 within that combustion chamber housing. As discussed below, the first and second internal liners 209 and 210 direct air to the fuel 203 supported within the combustion chamber 118 (or by one or more walls or wall structures thereof), or around the fuel in a manner that bypasses or substantially bypasses the region within which combustion is taking place (or is primarily taking place). Additionally, the cleanout door 206 has a fuel grate 236 and an area 237 for holding ash. The door 206 and door 222 are retained by bolts 238 and wing nuts 239.

More particularly with respect to the first and second internal liners 209 and 210, air directed so as to flow between the first and second internal liners 209 and 210 bypasses the region within the combustion chamber 118 at which the fuel 203 is being combusted—as discussed below, that bypassed air is directed to a location above the fuel 203. By contrast, air directed so as to flow between the first internal liner 209 (which is concentrically surrounding the second internal liner 210) and an outer housing of the combustion chamber 118 (which concentrically surrounds the first internal liner 209 and is the portion of the combustion chamber that is particularly marked with the reference numeral 118 as shown in FIG. 2(*a*)) is directed to the fuel 203 (or to a location just beneath the fuel) so that the air is directly fed to generate combustion of the fuel 203. The internal liners 209 and 210 also serve as insulation to minimize heating of the pressure vessel and heat loss.

The second internal liner 210 also has flow directing holes 211 to distribute the air in the combustion chamber 118 and possibly create recirculation or swirling gas flow. It should be recognized that the flow directing holes 211 particularly direct air to an interior region within the combustion chamber 118 that is above, and downstream of, the location of the fuel 203 at which combustion is taking place (or at which combustion primarily takes place). The flow directing holes 211 may have any number of styles or forms or take any of a variety of shapes such as, for example, a "T" shape with inside corners bent in to direct flow, or simply the form of drilled holes, drilled straight or at angles depending on the desired flow pattern. These flow patterns along with ceramic or metal beads 204 of different shapes or a grid or mesh may be used in the combustion chamber 118 (e.g., by intermixing the ceramic or metal beads 204 among the solid fuel 203 as illustrated) to control combustion, to control temperature, to optimize combustion, to minimize formation of nitrogen oxides, or to allow consumption of different fuel. Also, the makeup of the fuel pellet may be controlled to allow for the use of certain fuels such as, for example, post-consumer packaging waste with plastic content. This waste may be mixed into pellets at a certain ratio with other fuels such as wood to allow efficient combustion and possibly along with water or other noncombustible content incorporated for various reasons, such as to lower peak temperature and minimize formation of nitrogen oxides.

In the present embodiment of the new/improved internal combustion engine 10, to achieve control of the pressure within the combustion chamber 118, a rate of combustion is controlled by varying the amount of air supplied to the fuel 203. If the pressure within the combustion chamber 118 is low, more combustion is needed and more air is directed to the fuel 203. If the pressure within the combustion chamber 118 is high, less combustion is needed and more air is diverted around the fuel 203. As shown, air enters the combustion chamber 118 by coming via the transfer pipe 110 to a combustion control valve body 241, in which a flow plate 214 can vary the flow restriction into each of a first pipe 212 that proceeds to the location of the fuel 203 and a second pipe 213 that goes around the fuel. The flow plate 214 is moved by a piston 218 with a seal 215 in a cylinder 219 acting against a spring 217 which is retained by a cap 216. Actuation of the piston 218, so as adjust the positioning of the flow plate 214, is governed by the pressure within the compression chamber 118, which is coupled to (and influences positioning of the piston 218) by way of a line 220.

The combustion control valve body 241 can also be referred to as a diverter valve given that the valve can be understood to divert a portion of the compressed air received at the combustion chamber 118 away from the fuel 203 and instead to a location apart from and downstream of, the fuel. Notwithstanding the description provided above, it is intended that the present disclosure encompass other the types of valves/valve mechanisms to achieve control over the proportion(s) of compressed air that are directed toward the fuel 203 for combustion or directed to bypass the region in which the fuel is located. Also, notwithstanding the presence of the combustion control valve body 241 or another form of diverter valve, it should be recognized that in some embodiments or operational circumstances (e.g., for a brief period of time), such a diverter valve will operate to direct all received compressed air toward the fuel 203 for combustion or direct all received compressed air around (or away from) the fuel, even though under usual operational circumstances there will be respective proportions of the received compressed air that are directed toward or around the fuel.

For purposes of additional illustration, FIG. 2(*c*) is provided to show a cross-sectional view, taken along a line C-C of FIG. 2(*a*), of the combustion control flow plate 214 of the new/improved internal combustion engine 10. Notwithstanding the above description, for combustion control and or air flow diverting, other types of valves or diverting mechanism may be used such as rotary "butterfly" valves (which are commonly used to throttle the intakes of spark ignited engines).

Further with reference to FIG. 2(*a*), combustion products and bypassed air leave the combustion chamber 118 through a passage 228 and enter the filters (or filter assembly) 119, which can also be referred to as a cyclonic filter assembly or housing 119, tangentially or in such a way as to promote circulation or swirl around an insulated lining 223 and a cylinder 224, with a ring 240. Ash or non-gaseous matter will tend to be driven to the outside and settle in the bottom against a cleanout door 222 with a seal 221. Additionally, combustion products and bypassed air can pass through holes or opening in the cylinder 224 and enter cyclone cones 225 and swirl around inner cyclone cone 226. Ash and non-gaseous matter tend to move outward and downward as gases enter the inside of inner cyclone cone 226 and move towards a mesh or porous plate filter 227. The filter 227 may be any such device as to allow gasses to pass while not allowing solid particles to pass through including, for example, a woven mess of ceramic strands or a ceramic solid porous matrix. Due to operation of the filters 119, which are in the gas stream ahead of the expansion piston 124 (see FIG. 1(*a*)), gasses leaving through the pipe 111 are essentially free of non-gaseous matter.

To further illustrate the characteristics of the filters 119, FIG. 2(*b*) is additionally provided, which shows a cutaway, cross-sectional view, taken along a line B-B of FIG. 2(*a*). FIG. 2(*b*) shows aspects of an inlet passage and cyclone filters of the filters 119, particularly the cylinder 224, the cyclone cones 225, and cyclone cone 226, and insulated lining 223.

Notwithstanding the above description, it should further be appreciated that, in alternate embodiments of the airlock/combustion/filtering assembly, other types or forms of filters can be employed instead of the filters 119 including, for example, an electrostatic filter or one or more filters that are non-cyclonic in structure. Also, in alternate embodiments, combustion-enhancing or pollution control components such as catalytic converters or particulate traps (not shown) may be incorporated into the airlock/combustion/filtering assembly and/or associated filter design. Further, although not shown in FIG. 2(*a*), the combustion chamber 118 can also include an over-pressure relief valve and/or possibly a controlled rupture device protect the combustion chamber.

Referring still to FIG. 2(*a*), not related to power regulation but for the purpose of promoting complete combustion prior to the combustion products leaving the combustion chamber 118, the combustion chamber is divided into at least two parts or zones. Some air is always directed past the fuel 203 to this secondary combustion zone, promoting complete combustion of the fuel. As the engine 10 operates, the fuel 203 is burning more or less constantly within the combustion chamber 118, flaring up as air is supplied and subsiding between air transfers in when the oxygen level is low. Compared to the engine combustion rates of some conventional engines, the combustion within the combustion chamber 118 can take place at a slow rate, as long as the combustion chamber is large enough to allow enough fuel and air to combust to supply each cycle of the piston 124 (or pistons, in embodiments having multiple cylinders and pistons). The manner in which combustion occurs is much closer to a continuous process in the new/improved internal combustion engine 10 than is the case in conventional engines, in which combustion occurs as distinct, time-limited combustion events. Except for some liquid and gaseous fueled embodiments as also encompassed herein, there is typically (or always) excess fuel within the combustion chamber 118 compared to the air flow into the combustion chamber at any one time. For example if wood pellets are used as fuel, any one piece of fuel in the new/improved engine 10, once burning, will do so over many cycles of the engine, taking a long time (e.g., minutes) to fully combust.

Figure 3A:
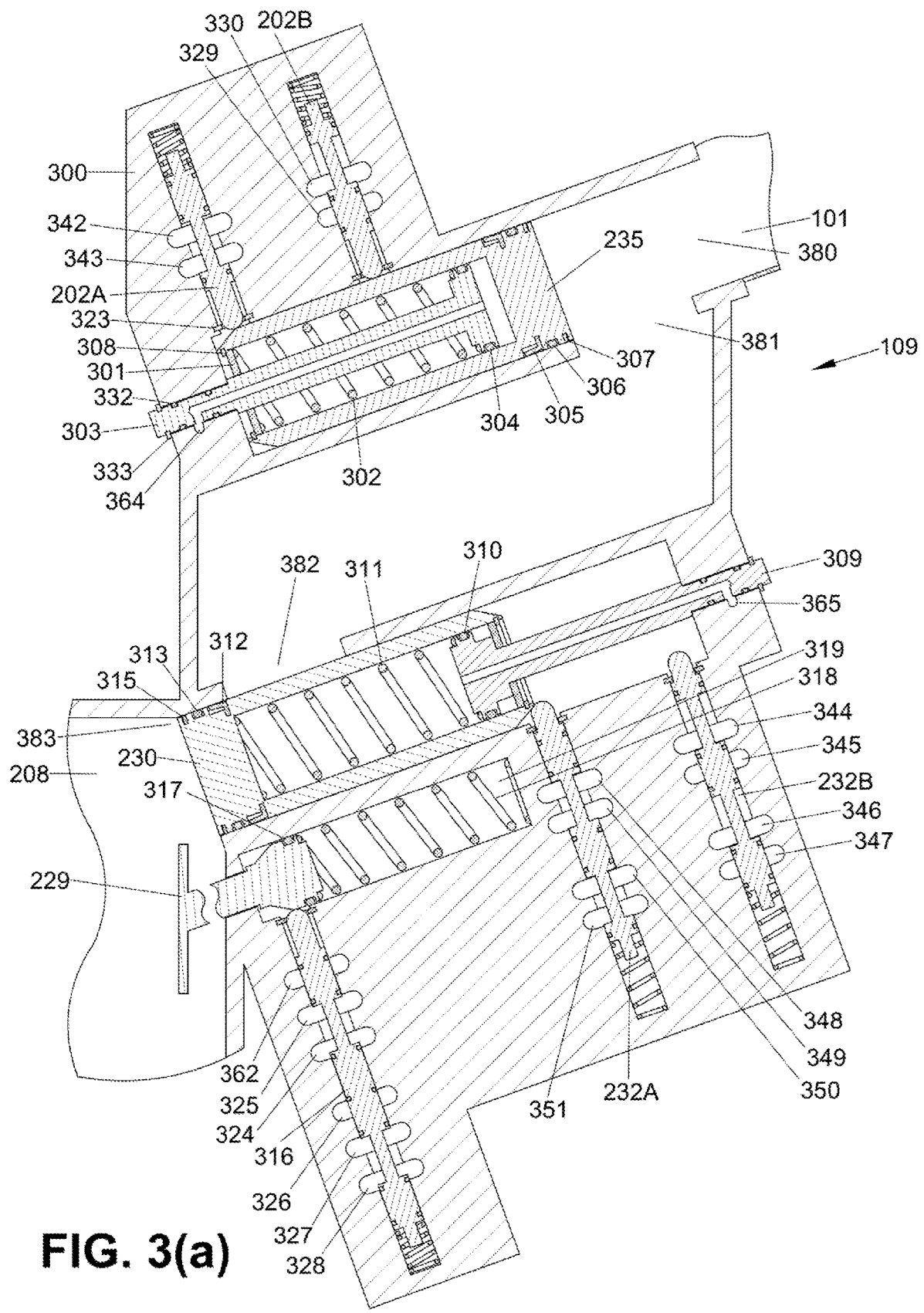
FIG. 3(a) is a cutaway, cross-sectional view of the airlock (for fuel transfer) and associated controls of the internal combustion engine shown in FIG. 1(a) and further shown in FIG. 2(a), taken along a line E-E of FIG. 2(a)
Figure 3B:
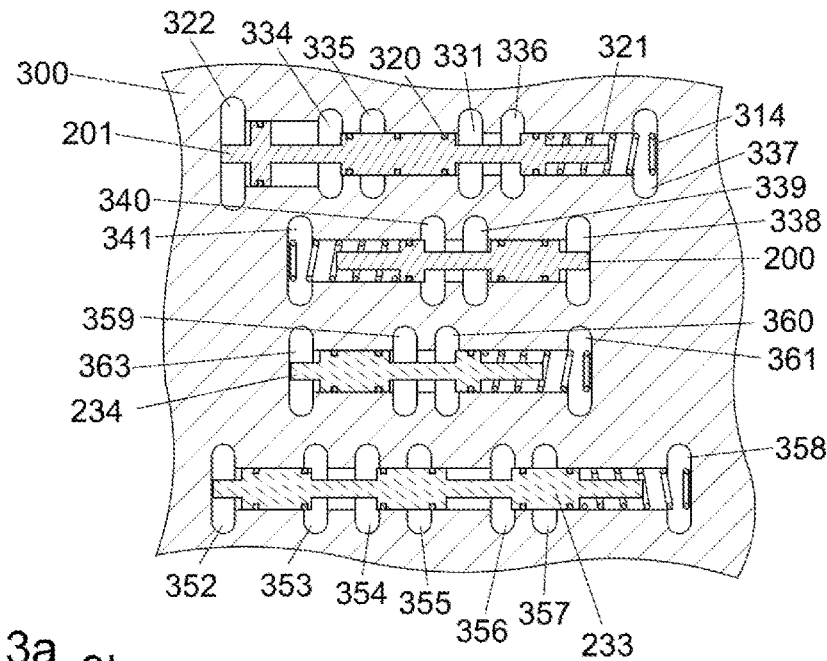
FIG. 3(b) is a cutaway, cross-sectional view of additional controls associated with the airlock shown in FIG. 3(a), taken along a line F-F of FIG. 2(a)

Referring now to FIG. 3(*a*) and FIG. 3(B), details of the airlock 109 for fuel transfer that is employed by the new/improved internal combustion engine 10 of FIG. 1(*a*), and associated controls (or control mechanisms) are shown. To facilitate an understanding of the components of and associated with the airlock 109, FIG. 3(*a*) shows a cross-sectional view of the airlock 109 and surrounding components taken along a line E-E of FIG. 2(*a*), and FIG. 3(*b*) shows an additional cross-sectional view of certain additional associated components taken along a line F-F of FIG. 2(*a*). It should be appreciated that, in the discussion below relating to FIG. 3(*a*) and FIG. 3(*b*), several of the referred-to structures are shown in FIG. 3(*a*) and others are shown FIG. 3(*b*).

The airlock 109 transfers portions of the solid fuel 203 from the fuel hopper 101, which is a low pressure region, to the combustion chamber 118, which is a high pressure region. The airlock 109 is (or includes, or is formed by) the airlock body (or pressure vessel) 300 having, as already mentioned above, the LPD (low pressure door) 235. The LPD 235 particularly is held open by a spring 302 that is connected to the LPD by a guide and backing washer 301 and a retaining ring 308 guided by a fixed piston and rod 303 with a seal 304. When the LPD 235 is open (as shown in FIG. 3(*a*)), portion(s) of the fuel 203 (see FIG. 2(*a*)) is or are allowed to pass into and fill the airlock 109 by way of a first orifice 380 and a second orifice 381. Additionally as shown, the airlock 109 further includes the HPD (high pressure door) 230, the opening and closing of which is also governed by a spring 311, which governs whether portion(s) of the fuel 203 that have entered the airlock 109 are able to proceed into the combustion chamber 118 via a third orifice 382 and a fourth orifice 383. As illustrated in FIG. 3(*a*), the HPD 230 is shown to be closed and consequently any of the fuel 203 that might be present in airlock chamber (located between the LPD 235 and HPD 230) is precluded from proceeding into the combustion chamber 118.

As already discussed above, the fuel 203 within the airlock 109 (and/or within the airlock/combustion/filtering assembly overall) may be of many types and forms. Depending upon the embodiment, the engine 10 can be built to use just one type of fuel or be accepting of many different types of fuels, and/or be built with or without modification to permit the use of different fuels. Two examples of possible fuels are wood fuel pellets and dried corn. It is envisioned that the size of the individual pieces of the fuel 203 in the present embodiment is approximately a cylinder ¼" diameter by ⅜" long albeit, in other embodiments, pieces of fuel can be of other sizes (or shapes). The fuel proceeds from the fuel hopper 101, through the airlock 109, into the combustion chamber 118, and as combustion starts, the fuel 203 need not be purposely reduced in size (e.g., ground up). Also, as already discussed above in regard to FIG. 2(*a*), the fuel 203 can be mixed with other materials, such as the ceramic or metal beads 204.

With respect to the sequence of operation of the airlock 109 in FIGS. 3(*a*) and 3(*b*), the starting (unenergized) states are when the trigger (TRIG) 229 (TRIG) is on, the LPV (low pressure vent) 200 is open, the LPD 235 is open allowing the airlock to be full of the fuel 203 (if some of the fuel was in the fuel hopper 101), the LPS (low pressure switch) 201 is low, the HPV (high pressure vent) 233 is closed, the (HPS) high pressure switch 234 is low, and the HPD 230 is closed. The TRIG 229 being on will close both the LPV 200 and LPD 235. When the LPD 235 is closed it will open the HPV 233. The HPV 233 being open will drive both LPS 201 and HPS 234 to high. When the HPS 234 goes high it will turn off and reset the TRIG 229 (pull it in) and open the HPD 230. When the HPD 230 is fully open it will close the HPV 233 and itself the HPD 230. The opening and closing of the HPD 230 is slowed by a flow restrictor (not shown) to allow time for fuel to flow out of the airlock 109. When the HPD 230 closes, the LPV 200 opens causing LPS 201 and HPS 234 to go low. The LPS 201 going low will open LPD 235 which will set the TRIG 229. With the TRIG 229 set, it will expand outward by a spring 318. The presence of portion(s) of the fuel 203 stops the travel of the TRIG 229 (because the fuel 203 would block the extension of the TRIG 229 piston outward). As the fuel 203 is used, or if the fuel is absent, the TRIG 229 will extend and go "on" and start the sequence over.

Further in regard to the sequence of operation of the airlock 109 in FIGS. 3(*a*) and 3(*b*), it should be appreciated that several of the above-described components are either connected to the combustion chamber 118 so as to be exposed to the pressure within the combustion chamber, or vented to atmosphere, to power their actions. Any one component cannot be connected to the combustion chamber 118 pressure and vented to atmosphere at the same time. The TRIG 229 is set by the combustion chamber 118 pressure when the LPD 235 is open. The LPD being open pushes in a low pressure door switch spool 202A, thereby opening a connection between grooves 342 and 343. The outward travel of the spool 202A is stopped by a spool retainer 323. It should be recognized that similar retainers are used on others of the switches, but are not numbered and referenced. Passages (not shown) respectively connect the groove 342 to the combustion chamber 118 pressure and the groove 343 to the cylinder 319, respectively.

Additionally, the TRIG 229 is turned off or reset when the HPD 230 is open, connecting the TRIG to atmosphere. The HPD 230 being open pushes in a high pressure door open switch spool 232B, thereby opening a connection between grooves 344 and 345. Passages (not shown) connect the groove 344 to atmosphere and the groove 345 to the cylinder 319. Also, the LPV 200 is closed by the combustion chamber 118 pressure when the TRIG 229 is on. The TRIG 229 being on pushes in a trigger switch spool 316, thereby opening a connection between grooves 325 and 324. Passages (not shown) connect the groove 324 to the combustion chamber 118 pressure and the groove 325 to a groove 338. Also, passages connect port 339 to the interior of the airlock 109, and ports 340 and 341 to atmosphere. The LPV 200 is opened by venting to atmosphere when the TRIG 229 is off, such that the LPS 201 is high and the HPD 230 is closed. The TRIG 299 being off allows the switch spool 316 to move out, thus connecting grooves 326 and 362.

Further, an airlock chamber pressure with the airlock 109 is connected to a groove 322, which acts on one area of the LPS (low pressure switch, or low pressure switch spool) 201, thereby shifting it to a "high" position when airlock chamber pressure is above atmospheric pressure. A groove 337 is connected to atmospheric pressure. A spring 314 acts to keep the LPS (or LPS spool) 201 in the "low" position. Pressure differences are sealed by seals 320. It should be appreciated that all of the respective valves that are shown in FIGS. 3(*a*) and 3(*b*) have similar such seals and springs specific to each valve but not numbered and referenced further. The LPS (or LPS spool) 201 being in the "high" position connects grooves 334 and 335. The HPD 230 being closed shifts a high pressure door switch spool 232A outward, thereby connecting grooves 348 and 349. Passages (not shown) connect the grooves 338 and 325 together, the grooves 362 and 334 together, the grooves 335 and 348 together, and the groove 349 with atmospheric pressure.

Additionally, the LPD 235 is closed by the combustion chamber 118 pressure when the TRIG 229 is on, and the LPD is opened by venting to atmosphere when the TRIG is off and the LPS 201 is low. The TRIG 229 being on pushes in the switch spool 316, thereby connecting grooves 328 and 327. Passages (not shown) connect the combustion chamber 118 pressure to groove 328 and connect the groove 327 and a groove 364. The TRIG 229 being off allows the switch spool 316 to move outward, thereby connecting the grooves 327 and 326. The LPS 201 being low connects grooves 331 and 336. Passages (not shown) connect the grooves 364 and 327, the grooves 326 and 331, and the groove 336 to atmosphere. The HPV 233 is opened by the combustion chamber 118 pressure when the LPD 235 and HPD 230 are closed, and the HPV is closed by venting to atmosphere when the HPD is open. The LPD 235 being closed allows a low pressure door closed switch spool 202B to move outward, thereby connecting grooves 329 and 330. The HPD 230 being closed allows the switch spool 232A to connect grooves 350 and 351. Passages (not shown) connect the grooves 330 and 350, the groove 351 and a groove 352, and the combustion chamber 118 pressure to the groove 329.

Further, the HPD 230 being open pushes in the switch spool 232B, thereby connecting grooves 346 and 347. Passages (not shown) connect the grooves 352 and 346, and the groove 347 to atmosphere. The HPD 230 is closed by the combustion chamber 118 pressure when the HPV 233 is closed, and opened when the HPV is open and the HPS 234 is high. The HPV 233 being closed connects grooves 353 and 354. Passages (not shown) connect the combustion chamber 118 pressure with the groove 353, and connect the groove 354 and a groove 365. The HPV 233 being open connects the groove 354 with the groove 355, and the groove 356 with the port 357. The port 357 is connected to the interior of the airlock 109. The ports 356 and 358 are connected to the combustion chamber 118. The HPS 234 has a groove 363 connected to the combustion chamber 118 pressure, and a groove 361 connected to the airlock chamber 109 pressure. Airlock pressure going high will shift HPS (or HPS spool) 234 and connect grooves 360 and 359. Passages (not shown) connect the grooves 365 and 354, the grooves 355 and 360, and the groove 359 to atmosphere. Screens and filters (not shown) may be integrated into passages, valves, or structure. Although FIGS. 3(a) and 3(b) show pneumatically-actuated components, it should be appreciated that the present disclosure is also intended to encompass other embodiments that instead (or in addition) employ electrically or hydraulically-actuated components, and/or employ other control systems or mechanisms including for example computers or program logic such as in a programmable controller for controlling/actuating such components.

Additionally as shown in FIGS. 3(a) and 3(b), the LPD 235 has two pressure seals 305 and 306 with a wiper ring 307 clearing solids away from the sealing face as the LPD (low pressure door) closes. The LPD 235 is closed by pressure being admitted through the passage in the piston and rod 303. With the LPD 235 closed, the airlock 109 is brought up to the same pressure as the combustion chamber 118. Then the HPD (high pressure door) 230 will open. Since high pressure now surrounds the outside of the HPD 230, venting internal pressure between the HPD and a piston and rod 309 associated with the HPD will cause the HPD to open, thereby compressing a spring 311 allowing fuel to pass into the combustion chamber 118. As with the rod 303 of the LPD 235, the rod of the piston and rod 309 is retained by a ring (similar or identical to the ring 333) and its flow passage has seals (similar or identical to the seals 332) between the rod and the bore in airlock body 300. There is also a seal 310 between the piston and HPD 230. Further, the HPD 230 has two pressure seals 312 and 313 and a wiper ring 315. The sequence is initiated by the TRIG 229 being extended by the spring 318 in the cylinder 319 with a seal 317. The valves have a bore 321, the spring 314, the switch (valve) spool 316, with the seals 320, and may be retained by the spool retainer (or ring) 323. The lands and grooves of the spool open and close passages intersecting the bore 321.

Figure 5A:
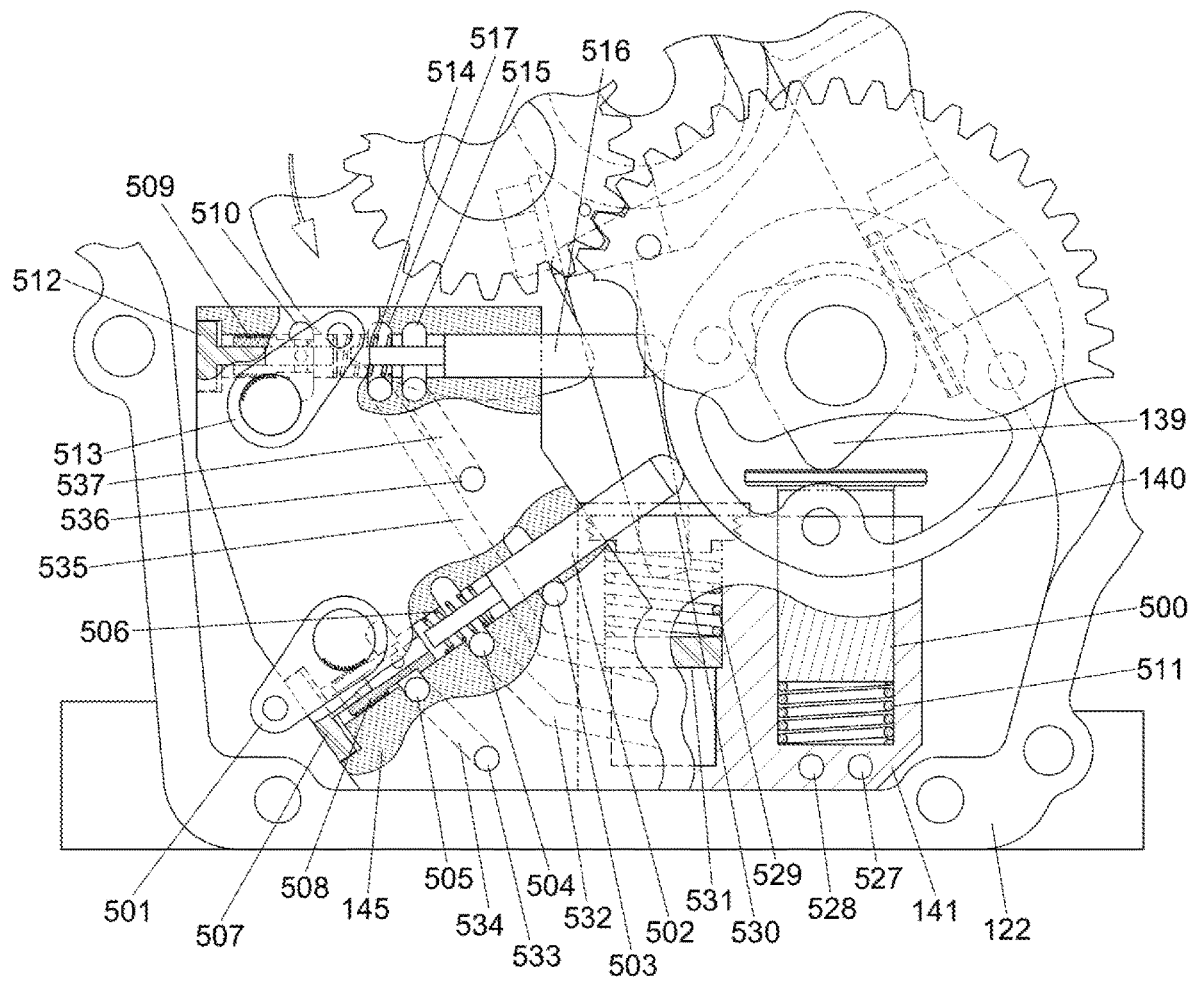
FIG. 5(a) shows a cutaway, cross-sectional view of portions of the new/improved engine of FIG. 1(a), which particularly illustrates a control mechanism for actuation of the compression and power valves of the engine.

Turning now to FIG. 5(a), a cutaway, cross-sectional view of portions of a control mechanism for actuation of the compression valve 756 and power valves 736 of the new/improved internal combustion engine 10 of FIG. 1(a) is provided. More particularly, FIG. 5(a) illustrates details of compression and power valve control valves of the embodiment shown in FIG. 1(a). In this embodiment, a timing control valve cam 140 has been added to the cam shaft. A valve body 145 houses timing valves for controlling the compression and power valves. Integral to the valve body 145 are passages connecting accumulators to the timing valves. The body may consist of several pieces. Some similar parts between compression valve 756 and the power valve 736 are not shown, being situated (and hidden) behind the shown parts—accordingly, it should be appreciated that, even though only one component is numbered and referenced in FIG. 5(a) (such as a pump plunger 500), each component is duplicated between the compression valve 756 and power valve 736.

Figure 5B:
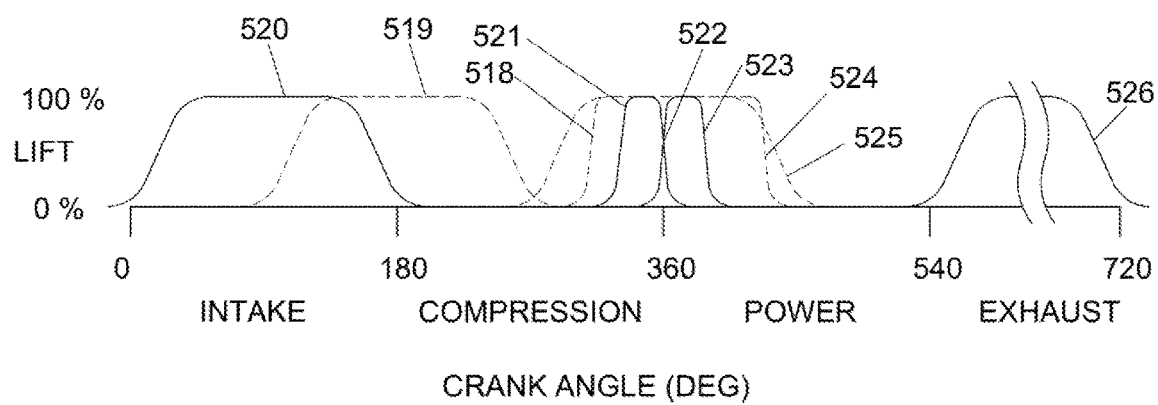
FIG. 5(b) is a diagram showing variation of valve lift of the compression and power valves of the engine relative to crankshaft angle (and accordingly shows details of timing and adjustment control mechanisms for actuation of the compression and power valves) of the engine of FIG. 1(a).

FIG. 5(b) is a timing diagram showing lift and timing details of the variation of valve lift of the compression valve 756 and power valve 736 of the engine 10 of FIG. 1(a) relative to the cam/crankshaft angle (and accordingly shows details of timing and adjustment control mechanisms for actuation of the compression and power valves). As shown in FIG. 5(a), two control valve spools 502 and 516 ride on the cam 140. Oil under pressure is supplied to a port 504 of the compression valve control valve through a passage 532. A valve spool 502 starts pushed into (within) the valve body 145. As it rides against cam 140, it travels out of valve body 145. In accordance with timing shown in FIG. 5(b), the valve spool 502 disengages with a valve sleeve 508, thereby allowing pressurized oil to flow to a port 505 through a passage 534 and an out port 533 and to the compression valve actuator opening the compression valve 756. Rotating of a control lever 501 moves the valve sleeve (or spool) 508. As it moves closer to the cam 140, the timing of the compression valve 756 opening is delayed. As the valve spool 502 continues to move outward, it opens the port 503, which allows oil to exit (or exhaust) from the compression valve actuator and accumulator closing the compression valve 756. The spring 506 keeps the valve spool 502 against the cam 140 when no oil pressure is present. An end cap 507 seals the valve bore and balances pressure on the valve sleeve 508. Orientations of the lever 501 and a lever 513 may be configured to work with specific actuator layouts.

Operation of the power valve control valve is similar. Oil under pressure is supplied to a port 517 of the power control valve through a passage 535. The control valve spool 516 starts pushed into (within) valve body 145. As it rides against the cam 140, it travels out of valve body 145. In accordance with timing shown in FIG. 5(b), the control valve spool 516 opens a port 515 allowing pressurized oil to flow through passage 537 to a port 536 and to the power valve actuator opening the power valve 736. As the control valve spool 516 continues to move outward, it disengages with (from) a valve sleeve 509, thereby allowing oil to exit (exhaust) through a port 510 from the power valve actuator and accumulator closing the power valve 736. A spring 514 keeps the control valve spool 516 against cam 140 when no oil pressure is present. An end cap 512 seals the valve bore and balances pressure on the valve sleeve 509. The rotating of the control lever 513 moves the control valve spool (or valve sleeve) 509. As it moves closer to the cam 140, the timing of the power valve 736 closing is delayed.

The aforementioned items can be combined into one valve instead of two, or broken apart into more than two valves. For example, the cam 140 may be split into more than one cam. The cam 140 can be so constructed to have a groove in place of the one surface in contact with the valve spools along with those spool having a pin or roller or such to allow them to engage in the groove. Also, the spools 502 and 513 can have a step or stop to limit their travel into body 145. Further, the spools 502 and 513 can be made as sleeves, along with the valve sleeves 508 and 509 being made as spools. The rotary motion of levers 501 and 513, can be replaced with linear manipulation of the valve sleeves 508 and 509. The toothed connection between the lever 501 and the valve sleeve 508 and between the lever 513 and valve sleeve 509 can be replaced with a cam or face on the lever 501 and the valve sleeve 508 manipulating the sleeves. Also, the valve sleeves 508 and 509 may have threaded elements that set their position by rotation of themselves or adjacent parts. The sleeves, spools, and bores may have slots, or other surfaces that by rotation of those parts sets the point at which oil can pass. The spools described moved outward to actuate (open and then close) the compression and or the power valve(s). The cam, cam following elements, and other control valve parts may be constructed to move inward or rotate to open and then close the compression and or the power valve(s). It is also possible to replace any number of these components with electrical, electromechanical, or electronic parts that perform the same functions as the aforementioned mechanical valves. A governor assembly 120 (see FIG. 1(*a*)) may be directly or indirectly connected to the lever 513 (which serves as a power control lever).

Further in regard to the new/improved internal combustion engine 10 shown in FIG. 1(*a*), FIG. 5(*a*) shows pumps and accumulators in the crankcase 122 to supply high pressure oil to compression and power valve actuating and control components. The cam(s) 139 pushes on the pump plunger(s) 500 in a pump body 141 acting against springs 511. The pump plunger(s) 500 draw in oil through one or more check valves (not shown) and pump it through another check valve or valves (not shown), through passages 527 and 528, to accumulator pistons 531 acting against springs 529, as retained by vented caps 530 (it should be recognize that not all flow passages are shown in FIG. 5(*a*)).

It should be recognized that, in the present embodiment, the new/improved internal combustion engine 10 has two cams (both shown as 139), one for actuating the intake valve 115 and one for actuating the exhaust valve 105. These cams can function in the same, or substantially the same, manners as the cams would operate in a conventional single-cylinder engine (with possible modifications near top dead center). Due to reduction of clearance volume and piston-to-valve clearance around top dead center, the intake valve 115 and exhaust valve 105 should not be open. These same cams 139 are used to power two pumps (by way of the pump plungers 500) that feed the two accumulators (or accumulator pistons 531).

Referring again to FIG. 5(*b*), the timing diagram (or graph) shows the lift and timing of the intake cam by way of a first curve 520 and shows the lift and timing of the exhaust cam by way of a second curve 526. The timing curves of the pumps (shown as dashed lines, with operation of the compression pump being shown by a third curve 519 and operation of the power pump being shown by a fourth curve 525) are shifted from the timing curves of the intake and exhaust cams because pump plungers 500 are at different locations than the (valve) pushing tappets 137. The timing diagram (or graph) of FIG. 5(*b*) particularly shows two lift curves for both the compression valve 756 and the power valve 736. The first curve 518 for the compression valve 756 is when the combustion chamber 118 pressure is low and that compression valve opens early. When the piston 124 is at a top dead center (minimum volume) position as represented by a location 522 in FIG. 5(*b*), the compression valve 756 closes and power valve 736 opens. The second curve 521 is when the pressure is high and the compression valve 756 opens later. The first curve 523 for the power valve 736 is for early closing of that valve, for low power output of the engine (see FIG. 4(*c*)). The second curve 524 is for late closing of the power valve 736 for full power of the engine (see FIG. 4(*a*)).

It should be appreciated that FIG. 5(*b*) illustrates operation of a 4 stroke engine. It applies also to a 2 stroke engine by deleting the intake and exhaust sections of the graph (from 0 to 180, and 540 to 720 crank angle degrees). The crank angle degrees for compression would be 0 to 180 and the power would be 180 to 360. In such case, the cams 139 would need to be on the crankshaft, or other mechanism would be provided to supply high pressure oil to the compression and power valves controls and actuators. The compression and power valve control components may have additional mechanisms of adjustment that can be for set up or during operation, such as for example slots to allow cam 140 to be moved relative to the gear 138, and or adjustable elements on the valve spools 502 and 516.

Figure 6:
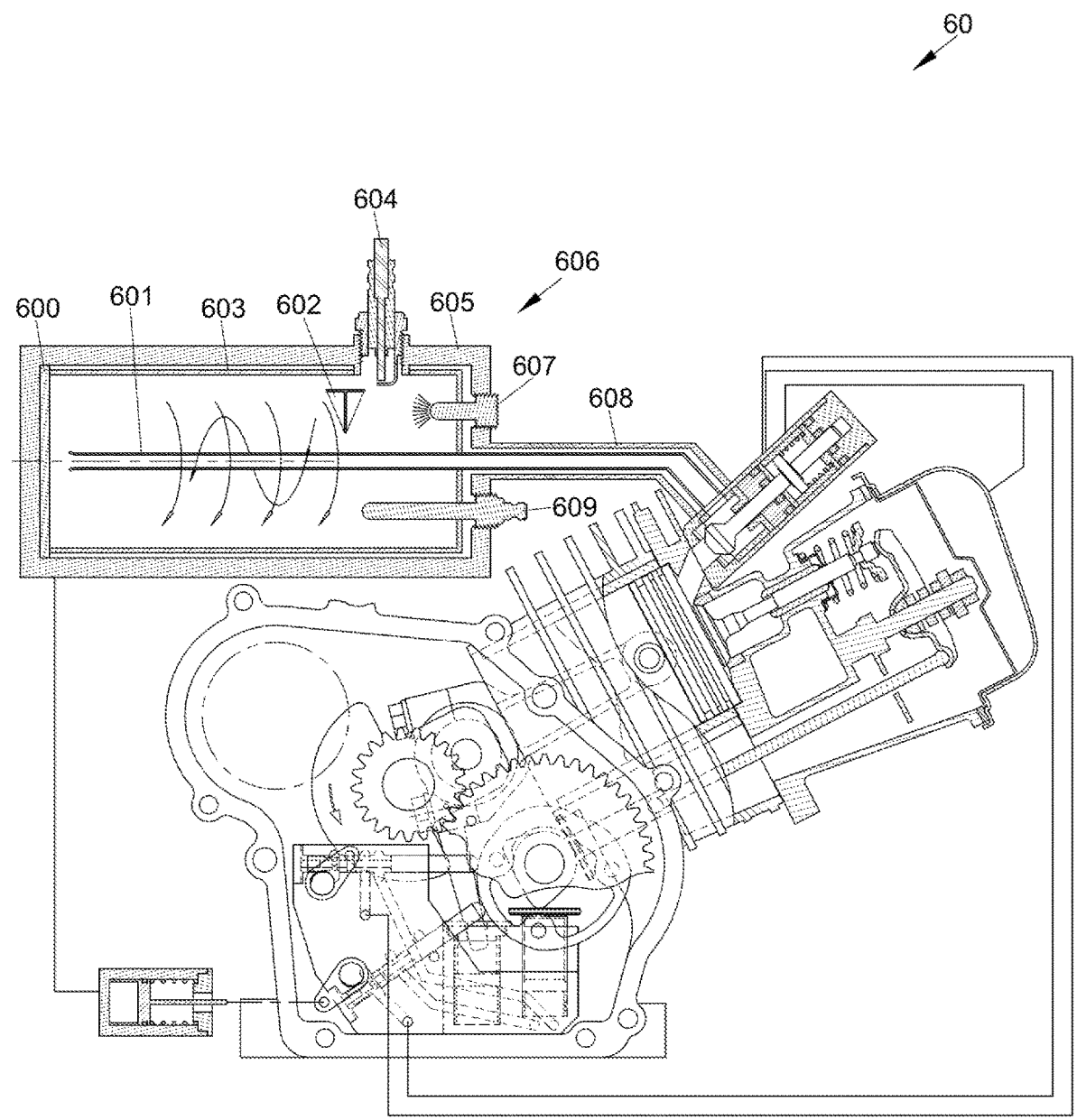
FIG. 6 shows a new/improved internal combustion engine in accordance with another example embodiment encompassed herein, in which the engine is a single cylinder engine with variable timing of compression and power valves, and a separate combustion chamber using liquid and or gaseous fuel.

Referring now to FIG. 6, a new/improved internal combustion engine 60 in accordance with an additional example embodiment encompassed herein is illustrated. In this embodiment, the new/improved internal combustion engine 60 is constructed in a manner that is identical (or substantially identical) in most respects to the new/improved internal combustion engine 10 of FIG. 1(*a*). However, in this embodiment, certain components of the engine 10 that were appropriate for use with the solid fuel, such as the combustion chamber 118, have been replaced with other components that are suitable for burning liquid or gaseous fuel, such as a combustion chamber 606. Although suited for burning liquid or gaseous fuel that may also be burned/combusted in some conventional engines, it is anticipated that the new/improved internal combustion engine 60 is advantageous by comparison with at least some such conventional engines (e.g., at least some such standard spark ignited and compression ignition engines) insofar as it is envisioned that the new/improved engine may be able to achieve operation with lower emissions. Such operation with lower emissions may be attributed to the lower operating pressure and temperature, longer burning time available, and more optimum combustion chamber shape and/or layout of the new/improved internal combustion engine 60 (which is or are not possible in such conventional engines).

More particularly with respect to the combustion chamber 606 of the new/improved internal combustion engine 60 as shown in FIG. 6, air (e.g., compressed air) enters the combustion chamber from a compression valve (e.g., the compression valve 756) of the engine by way of a pipe 608. Further, combustion products and excess air are returned to a power valve (e.g., the power valve 736) via a pipe 601. Fuel (liquid or gaseous) is injected into the combustion chamber 606 by one or more injectors 607. Additionally, combustion may be ignited or enhanced by a spark plug 604 (and/or a heater, igniter, or glow plug 609). The combustion chamber 606 particularly has a pressure vessel (or body) 605 with a liner 603 that is used to direct air and insulate the pressure vessel along with insulation 600. The liner 603 includes air flow directing holes 602 to distribute the air in the combustion chamber 606 and possibly create recirculation or swirling gas flow. The flow directing holes 602 may have any number of styles or forms or take any of a variety of shapes such as, for example, such as the "T" shape with inside corners bent in to direct flow, or simply the form of drilled holes, drilled straight or at angles depending on the desired flow pattern. These flow patterns along with ceramic or metal beads of different shapes (e.g., the ceramic or metal beads 204 shown in FIG. 2(*a*)) or a grid or mesh may be used in the combustion chamber 606 to control combustion, to control temperature, to optimize combustion, to minimize formation of nitrogen oxides, or to allow consumption of different fuel.

Figure 7:
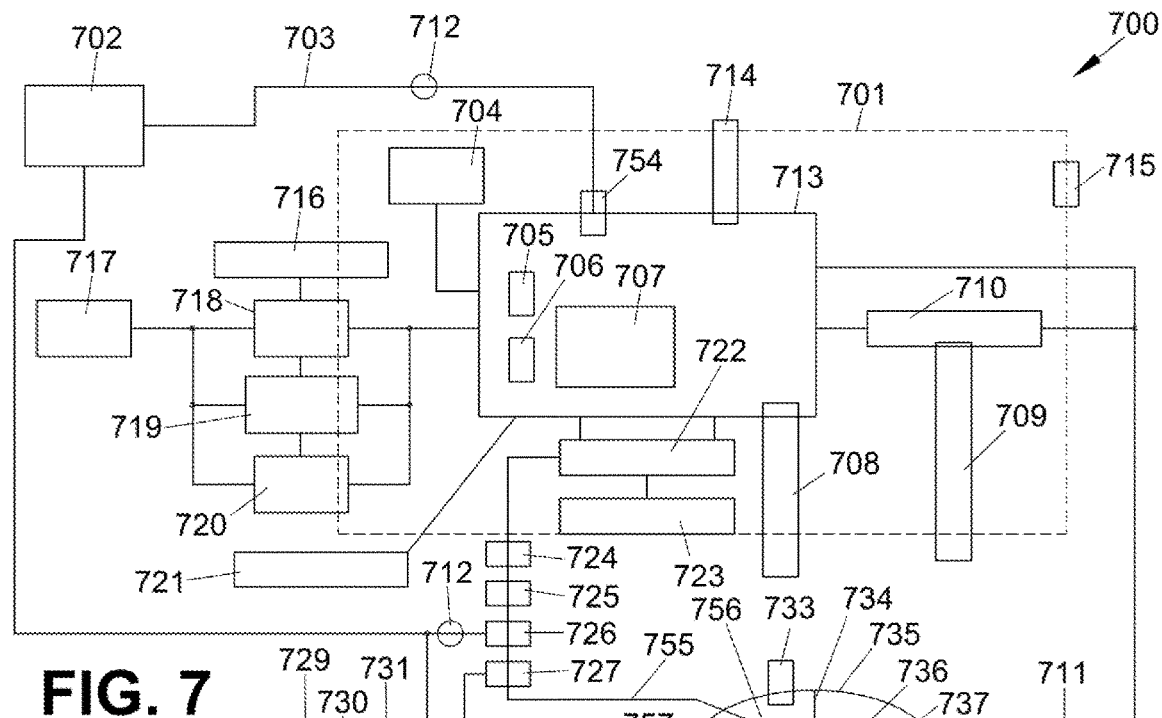
FIG. 7 is a block diagram representing, in schematic form, any of several new/improved internal combustion engines that are encompassed herein, including for example the engines of FIGS. 1(a) and (6).

Referring now to FIG. 7, a diagram is provided to illustrate in schematic form a new/improved internal combustion engine 700 that is representative of (or in accordance with) many example embodiments encompassed herein, including the new/improved internal combustion engines 10 and 60 shown in FIGS. 1(a) and 6. The particular forms and manners in which solid (or liquid or gaseous) fuels are handled, and/or the particular manners of controlling and actuation of the compression and power valves using hydraulics, by one or more of the new/improved engines encompassed herein may be embodied into engines having many different configurations in addition to those specifically described above or herein. The new/improved internal combustion engine 700 of FIG. 7 is intended to show features that will be found in numerous different new/improved engines (albeit not necessarily all of the new/improved engines) encompassed herein.

As shown, the new/improved engine 700 of FIG. 7 has compression and expansion devices 735 and 738 that can respectively be, for example, a cylinder and a piston therewithin. Additionally, the new/improved engine includes a pressure vessel (or airlock/combustion/filtering assembly) 701 that has a combustion chamber 713, which may have a fuel and possibly ash handling mechanism 707, and that also has an over pressure relief valve 715. Liquid or gaseous fuel(s) 702 may be conveyed into the pressure vessel 701 and combustion chamber 713 by lines 703 and pump or regulator 712 and possibly injector 754. To start and or maintain combustion, a fuel igniter mechanism 705 and or a heater 706 may be in the combustion chamber 713, and/or incoming compressed air may be heated by a further heating mechanism 724. In addition, or alternatively (instead of liquid or gaseous fuel(s)), solid fuel 717 may be transferred into the pressure vessel 701 by way of an airlock 718, and/or a plunger/passage mechanism 719, and/or a melt and pump mechanism 720, those having controls 716. Also as shown, solid fuel 704 may be loaded into the pressure vessel 701 while it is at atmospheric pressure, and then the pressure vessel 701 may be sealed and brought up to operating pressure.

Possibly for starting, compressed air 721 may be supplied to the combustion chamber 713 with and or without a vent 714 being open to allow fuel to burn without building pressure in the combustion chamber. With the vent 714 closed, the compressed air 721 and combustion will raise the pressure of the combustion chamber 713, possibly to full operating pressure. This may require a high starting torque input. The engine 700 may be started at full pressure. In that case, compression valve controls 747 may not have adjustable timing. Working fluid compressed air is supplied to the combustion chamber 713 through a passage 755 passing through a mechanism 722 that is for providing combustion controlling, diverting, and directing, which has controls 723. These work to control the combustion chamber 713 pressure at the design level, increasing combustion if pressure is low and decreasing combustion if pressure is high. To achieve high thermal efficiency and allow for high power output, the combustion chamber 713 pressure should be high and remain high regardless of load. This high pressure could be varied during engine operation, such as by relating it to the air pressure in a compressor intake passage 741.

Intake air 728 is at a pressure of approximately 15 psi absolute. An increase or decrease of this pressure when it is in the compression and expansion devices 735 and 738 greatly affects the pressure and amount of air transferred to the combustion chamber 713. Air pressure in a passage 741 may be increased by a turbo compressor 729 being powered by exhaust gas 740, by a turbine 739 in an exhaust passage 742, and/or by a turbo compressor or blower 730 being powered by the output of the engine 700 as derived from an output structure 753 of the compression and expansion devices 735 and 738 (e.g., an output piston rod extending from those devices). The density of that air may be increased by going through an intercooler 731. Possibly for starting, easily ignitable fuel may be introduced by mechanisms (e.g., fuel injectors) 732 or 726 in the intake passage 741 or the compressed air passage 755. The mechanisms 732 or 726 may work with igniter mechanisms 733 and/or 725 to power the engine 700 and/or ignite solid or melted fuel in the combustion chamber 713. Combustion products and compressed air may pass through one or more filters 710 to remove solids from those gases before being transferred out to the combustion chamber 713 through a passage 711. In at least some embodiments or implementations, there may be mechanisms 708 and 709 of cleaning out/removing ash and other solids from the combustion chamber (or combustion chambers) 713, filter(s) 710, and pressure vessel (or vessels) 701. The mechanisms 708 and 709 may be manually manipulated or automatic mechanisms designed to be used intermittently or continually with the engine running or off (with the pressure vessel 701 at low pressure).

As mentioned above, the compression and expansion devices 735 and 738 include the output structure 753. Additionally, the compression and expansion devices 735 and 738 include additional components, including an air intake valve 757 or an air intake port 743, a compression valve 756, a power valve 736, and an exhaust valve 737 or an exhaust port 744. These components may be all together (grouped together) or split into separate compression components and expansion components as represented by a line 734. Further, the engine 700 may be constructed to be a 4 cycle engine as in the embodiments of FIG. 1(a) and FIG. 6, or alternatively may be constructed to take on a different form, such as that of a 2 cycle engine. If taking the form of a 2 cycle engine, oil possibly for engine lubrication may be carried into the compression and expansion devices 735 and 738 by the air in the intake passage 741. This oil can be consumed in the combustion chamber 713 or it can be separated out by a separation mechanism 727 and possibly reintroduced into the intake passage 741. The intake valve 757 is actuated by power from the engine 700 by a powering mechanism 751. The exhaust valve 737 is actuated by power from the engine 700 by a powering mechanism 752. Power from the engine 700 is used to supply and possibly store oil at pressure by way of additional mechanisms 749 and 750. Further, mechanisms 747 and 748 control the flow and timing of that oil to valve operating mechanisms 745 and 746 that open and close the compression valve 756 and the power valve 736.

Further in regard to the new/improved internal combustion engine 700 shown in FIG. 7, any embodiment may have any combination and multiples of the components described above. For example, the compression device and expansion devices 735 and 738 may have the one inlet port such as the inlet port 743 mentioned above, or alternatively any number of such inlet ports, and any one or more such inlet ports can connect to a single passage such as the passage 741 or to a manifold of passages that convey the intake air 728. Also for example multiple compression and expansion components 735 and 738 each with their own sets of valves or ports can connect to a single combustion chamber such as the combustion chamber 713, or to any number of combustion chambers. It should additionally be appreciated that, although the new/improved internal combustion engines 10 and 60 of FIG. 1(a) and FIG. 6 are envisioned as being engines that can employ, as portions of those engines, one or components of existing engines (and, in this sense, be constructed as conversions of existing engines), the present disclosure is intended to encompass numerous other embodiments of new/improved internal combustion engines that are entirely or substantially constructed or designed from scratch, and/or that are specifically built to use the processes and components or like components described herein.

Figure 8:
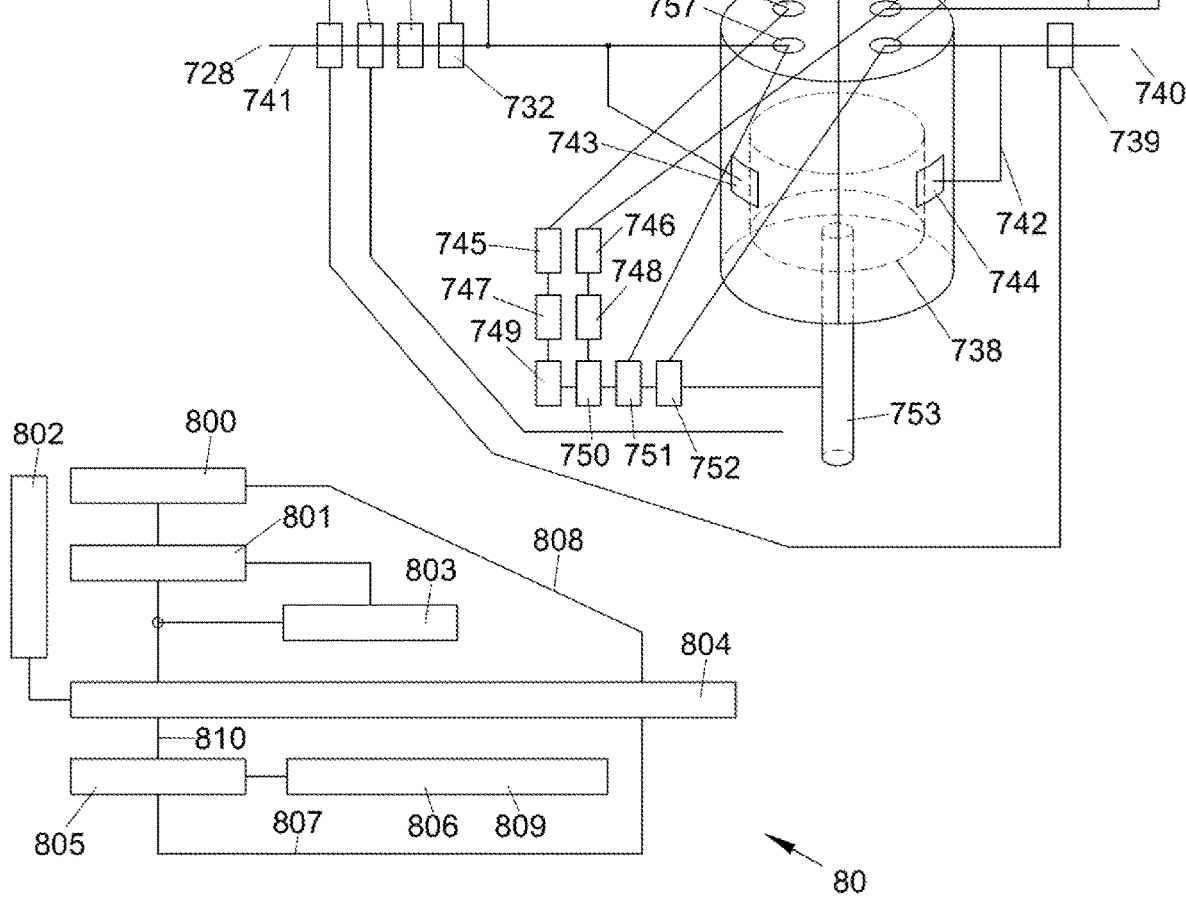
FIG. 8 is a block diagram representing, in schematic form, compression and power valve control and actuation as performed in any of several new/improved internal combustion engines that are encompassed herein, including for example the engines of FIGS. 1(a) and (6).

Referring now to FIG. 8, the components and operation of a new/improved compression or power valve actuation and control arrangement or system 80 is shown in schematic form. The system 80 shown in FIG. 8 is particularly configured to hydraulically actuate and control the timing of the compression valve 756 and power valve 736 mentioned above, and is intended to be representative of systems that can be implemented in (or in conjunction with) any of a variety of new/improved internal combustion engines encompassed herein (albeit not necessarily all such engines), including the engines 10 and 60 of FIG. 1(a) and FIG. 6. As shown, the new/improved system 80 has a pump 801 that receives and uses oil from an oil reservoir 800 and supplies that oil at pressure to a control valve 804, which possibly includes an accumulator 803 to store or maintain that oil at pressure. The control valve 804 has an input 802, which it uses to set the timing of sending oil under pressure through a line 810 to an actuator 805, which either opens the compression valve 756 (shown in FIG. 8 as a compression valve 806) or the power valve 736 (shown in FIG. 8 as a power valve 809).

Each of the compression valve 806 (or 756) and the power valve 809 (or 736) has its own respective actuator 805. Additionally, other components of the system 80 such as the pump 801 and/or the control valve 804 can be common between the compression valve 806 and the power valve 809, or duplicated and dedicated to each valve. The input 802 can be fixed, such as fixed at the timing of top dead center, or variable, such as at a desired power output. Using the input 802 and the control valve 804 allows the actuator 810 to close the compression valve 806 or the power valve 809 by either releasing oil pressure or both releasing oil pressure in one line and applying oil pressure in another. The oil lines 810 and 807 (if present) may convey oil in either direction and be at pressure or not, and the oil is returned by way of a return line 808 to the oil reservoir 800.

Figure 9:
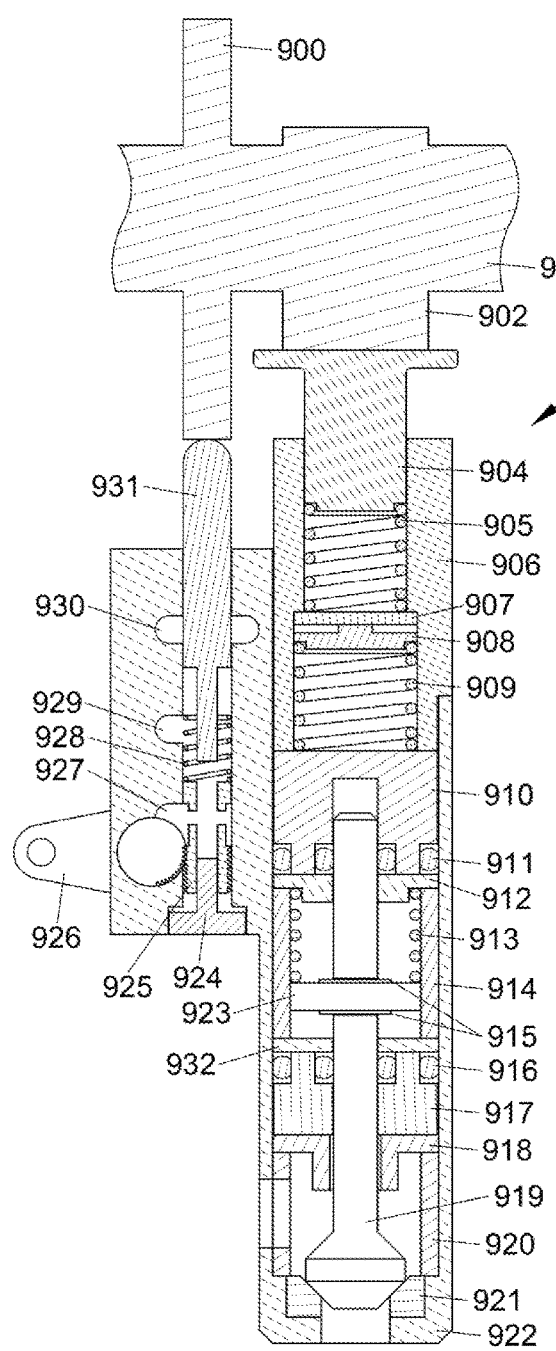
FIG. 9 is a cross-sectional view of a compression or power valve with an overhead cam of a new/improved internal combustion engine, in accordance with another example embodiment encompassed herein.

Referring now to FIG. 9, a cross-sectional view is provided of a new/improved compression or power valve (or valve assembly) 90 in accordance with one example embodiment encompassed herein. In this embodiment, the new/improved compression or power valve 90 is constructed to allow for its use in an overhead cam engine, as are found in many larger multi-cylinder engines, for example. The new/improved compression or power valve 90 can in particular serve in the role of either a compression valve such as the compression valve 756 described above or a power valve such as the power valve 736. More particularly, the new/improved valve 90 includes an upper valve body 906, a lower valve body 922, a housing valve stem 919, an insulating insert (not shown), a valve seat 921, an insulating sleeve 920, an insulating cap 918, a valve guide 917, seals 916 and 911, a seal retainer 932, a piston 923, retaining clips 915, a cylinder 914, a valve spring 913, a valve cap 910, a seal retainer and spring guide 912, and a gasket (not shown).

Pressure is balanced on the valve stem 919 by combustion chamber pressure being admitted to the bore in the valve cap 910 via a passage (not shown), possibly in the valve stem itself. The valve piston 923 and cylinder 914 are connected within the control valve. Insulating elements such as the insulating sleeve 920, the insulating cap 918, and the insulating insert (not shown) may be omitted from the valve 90 when it takes the form of a compression valve, due to the compressed air being at a much lower temperature than the combustion products going through the power valve. Additionally, oil is supplied to a valve pump by a mechanism that is not shown. Further, a cam shaft 901 has cams 902 and 900 that actuate a pump plunger 904 and a valve spool 931. As the cam 902 pushes on a compressing spring 905 of the pump plunger 904, it pumps oil at pressure to an accumulator formed by caps 907 and 908 that actuate a spring 909. Further, control valve passages 930, 929, and 927 connect to the accumulator (provided by the space between the caps 907 and 908), the valve actuator (under piston 923), and oil return. Timing is adjusted by a lever 926 which moves the sleeve 925. A spring 928 keeps the spool 931 against the cam 900. A plug 924 seals the control valve bore and serves to balance hydraulic forces on the sleeve 925.

Figure 10:
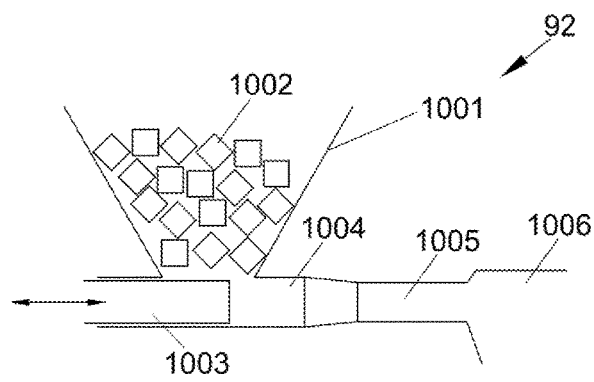
FIG. 10 is a schematic diagram illustrating a fuel transfer mechanism using a plunger and passage of a new/improved internal combustion engine, in accordance with another example embodiment encompassed herein.

Referring now to FIG. 10, a new/improved fuel transfer mechanism 92 in accordance with one example embodiment encompassed herein is illustrated. In this embodiment, the new/improved fuel transfer mechanism can be added to the embodiment shown in FIG. 1(a), or replace the airlock 109 and airlock controls of the embodiment shown in FIG. 1(a). The fuel transfer mechanism 92 particularly includes a fuel hopper 1001 that holds solid fuel 1002 and a combustion chamber 1006 (which can be the combustion chamber 118). The fuel transfer mechanism 92 operates to transfer the solid fuel 1002 from atmospheric pressure (as experienced at the fuel hopper 1001) to a combustion chamber pressure within the combustion chamber 1006, by using a forceful plunger that presses the fuel into a passage 1004. The passage 1004 is constricting, such that the pressed solid fuel forms an airtight seal and resists the force of the combustion chamber to push it out of the passage. Accordingly, as shown in FIG. 10, a plunger 1003 oscillates to press the fuel 1002 into the passage 1004 having a cross-sectional size 1005 that becomes reduced before reaching (or entering) the combustion chamber 1006. The plunger stroke is varied or intermittently stopped to regulate how much fuel is transferred. Further, the fuel transfer mechanism 92 can also include a mechanism for breaking up such hard-pressed fuel may be employed in the combustion chamber 1006, such as a sharp edge or bend that breaks the extruded fuel or a cutter or grinder (not shown).

Figure 11:
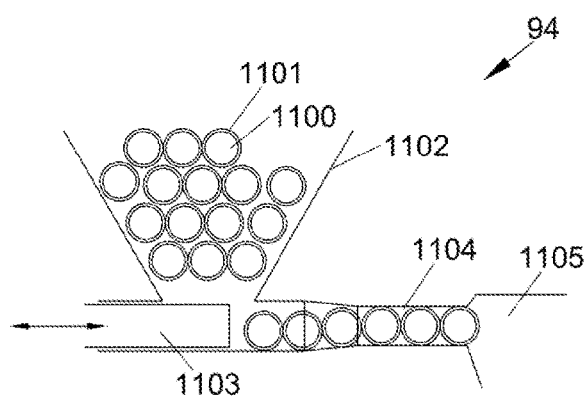
FIG. 11 is a schematic diagram illustrating a fuel transfer mechanism using a plunger and coated sphere like or pellet fuel of a new/improved internal combustion engine, in accordance with another example embodiment encompassed herein.

Referring now to FIG. 11, an additional new/improved fuel transfer mechanism 94 in accordance with an additional example embodiment encompassed herein is illustrated. In this embodiment, the new/improved fuel transfer mechanism 94 can be added to the embodiment shown in FIG. 1(a), or replace the airlock 109 and airlock controls of the embodiment shown in FIG. 1(a). In this embodiment, the new/improved fuel transfer mechanism 94 is for specifically prepared fuel sphere shaped pellets 1100 to be fed from atmospheric pressure to combustion chamber pressure. The pellets 1100 may be spherical, nearly spherical, pellet (cylindrical), or otherwise multisided solid. The pellets 1100 can have a soft coating on the outside that will form an airtight seal when the pellets are pushed through a specifically-designed passage. The pellets 1100 can also be formed so as to have a soft constituent that forms an air tight seal as the pellets are pushed through a specifically-designed passage.

As shown particularly in FIG. 11, the new/improved fuel transfer mechanism 94 particularly includes a fuel hopper 1102 that holds the fuel pellets 1100 with seal forming coating or constituent 1101. A plunger 1103 of the fuel transfer mechanism 94 oscillates, so as to push pellets 1100 into a passage 1104, at which the pellets form an airtight seal as the pellets are pushed into a combustion chamber 1105 (which can be the combustion chamber 118 of FIG. 1(a)). The plunger stroke 1103 is varied or intermittently stopped to regulate how much fuel is transferred.

Figure 12:
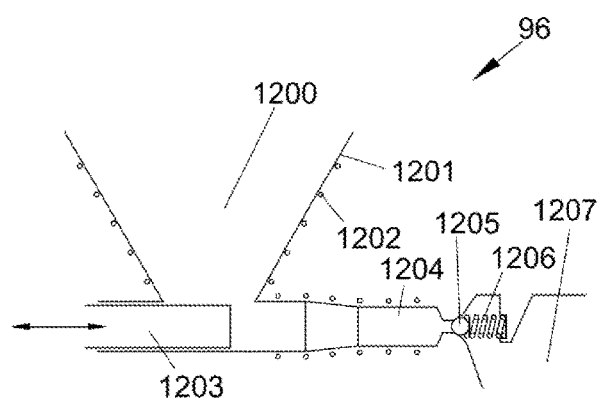
FIG. 12 is a schematic diagram illustrating a fuel transfer mechanism using melting and pumping of a new/improved internal combustion engine, in accordance with another example embodiment encompassed herein.

Referring now to FIG. 12, a further new/improved fuel transfer mechanism 96 in accordance with a further example embodiment encompassed herein is illustrated. In this embodiment, the new/improved fuel transfer mechanism 96 can be added to the embodiment shown in FIG. 1(a), or replace the airlock 109 and airlock controls of the embodiment shown in FIG. 1(a). This fuel transfer mechanism 96 is for fuels that can be melted and pumped, such as plastic. In this example, meltable fuel 1200 is loaded into a hopper 1201, which includes a mechanism 1202 for heating and melting the fuel. The mechanism 1202 can be, for example, electrical heating elements or lines carrying hot liquids or gases. Additionally as shown, the fuel transfer mechanism 96 includes a plunger 1203, which oscillates to push the melted fuel into a passage 1204, so as to press the melted fuel past a check valve made up of a ball 1205 and a spring 1206, into a combustion chamber 1207 (which can be the combustion chamber 118 of FIG. 1(a)). The combustion chamber 1207 can additionally be provided with specific components such as metal or ceramic beads (such as the ceramic or metal beads 204 discussed above) or mesh to facilitate the holding of the fuel while allowing air flow through it, and specific zones of air flow and combustion to achieve complete combustion. Burning meltable fuels may eliminate any need for ash filtration. The plunger 1203 stroke is varied or intermittently stopped to regulate how much fuel is transferred.

It should further be appreciated with respect to each of the new/improved fuel transfer mechanisms 92, 94, and 96, actuation and control can be provided by way of any of a number of different types of mechanisms. For example, with respect to any of these new/improved fuel transfer mechanisms 92, 94, and 96, actuation and control of any of the feeders (FIG. 10, FIG. 11, FIG. 12) may be mechanical, hydraulic, pneumatic, or electrical.

Notwithstanding the above description, it should be recognized that the present disclosure is intended to encompass numerous embodiments and arrangements of new/improved internal combustion engines, and components thereof, and methods of operation and implementation thereof, that are in addition to or modified versions of those described above. For example, although one or more of the new/improved internal combustion engines described above include any of a variety of control systems for governing the opening of the compression and power valves linking the compression and expansion devices of the respective engine with the combustion chamber, the present disclosure is also intended to encompass embodiments in which one or more of the compression valve or power valve (and/or possibly one or more of the intake valve or exhaust valve of the compression and expansion devices) is or are actuated by pressure differentials (e.g., a pressure differential between the combustion chamber pressure and the pressure within the compression and expansion devices (e.g., within an interior cylinder chamber between a piston and cylinder head of the piston and cylinder arrangement that provides mechanical output power from the engine). Also, in some embodiments encompassed herein, the compression valve (and/or power valve) is arranged to open outward away from the piston and cylinder (or other compression and expansion devices), toward the separate combustion chamber.

Also for example, although the above-described embodiments of the new/improved internal combustion engines 10 and 60 in FIG. 1(a) and FIG. 6 are engines having the single piston 124 and cylinder 174 as the compression and expansion devices that operate to compress intake air, receive combustion products (and bypass gases), and generate mechanical power output, the present disclosure is also intended to encompass other embodiments having multiple pistons and cylinders (or multiple other forms of compression and expansion devices). In some such embodiments, certain one(s) of the pistons and associated cylinders may serve the purpose of compression, and other one(s) of the pistons and associated cylinders may serve to receive combustion products (and bypass gases), and/or generate mechanical power output based upon the received combustion products (and bypass gases), which serve as the working fluid. Further, in regard to some such new/improved internal combustion engines that have multiple pistons and cylinders, such engines take the form of an inline (e.g., inline 4), V-8, or other engine in terms of the arrangements of pistons and cylinders.

As mentioned above, the present disclosure is intended to encompass a variety of different new/improved internal combustion engines that operate either as 4 stroke engines or as 2 stroke engines in terms of the number of strokes or movements of the piston (relative to the cylinder) that are performed to achieve each of the intake, compression power, and exhaust operations. Also, the present disclosure is intended to encompass new/improved engines that, in at least some embodiments, are naturally aspirated or turbocharged, or that include a blower and/or intercooler. Further, the present disclosure is intended to encompass a variety of new/improved internal combustion engines having any of a variety of different types of combustion chambers or airlock/combustion/filtering assemblies, including combustion chambers (or other assemblies or pressure vessels) having any of a variety of shapes volumes, fuel holding capabilities, and associated controls (e.g., for controlling air flow, burning/combustion, mixing, recycling, reburning/recombustion, etc.).

Additionally, although the above-described embodiments particularly include airlocks such the airlock 109 that have a single internal airlock chamber and first and second doors that govern whether that chamber is in fluid communication with either the combustion chamber or another location (e.g., a location coupled to the outside environment that is at atmospheric pressure), the present disclosure is also intended to include other embodiments having other types of airlocks and airlock chambers, including for example airlocks having more than two doors and airlocks having a series of sequentially-connected airlock chambers. Further for example, in an embodiment having an airlock with a series of sequentially-connected airlock chambers, a first door can govern whether a first of the airlock chambers is in fluid communication with the outside environment, a second door can govern whether a second of the airlock chambers is in fluid communication with the first airlock chamber, and a third door can govern whether the second airlock chamber is in fluid communication with the combustion chamber.

Additionally, the present disclosure is intended to encompass a variety of new/improved internal combustion engines having any of a variety of different types of valves and/or cams in the head or in the engine block, and/or having any of a variety of controls (e.g., mechanical, hydraulic, or electronic). Also, the present disclosure is intended to encompass any of a variety of new/improved internal combustion engines that employ any of a variety of different manners of timing, such as variable or fixed timing, and/or any of a variety of associated timing controls, including hydraulic actuation with timing controls to bring the combustion chamber's pressure to a high level and maintain it, or to control power by controlling power valve timing. Also, the present disclosure is intended to include embodiments of new/improved internal combustion engines that are (or include) heat exchanger engines rather than (or in addition to) combustion engines, as well as embodiments employing gas turbines.

Further, it should be recognized the present disclosure is also intended to encompass any of a variety of new/improved internal combustion engines that have one or more computers, processing devices, controllers, or control systems that perform, or allow for, automatic, partly-automatic, electronic, or computerized control of the aspects or features of the engines. Such computers, processing devices, controllers, or control systems can for example include any of a variety of computer devices or components or control devices or components, including for example microprocessor(s), programmable logic device(s), as well as related devices such as memory devices (e.g., random access memory or read-only memory devices) and input/output devices such as keyboards, touchscreens, monitors, and communications ports (including those that would permit wired or wireless communications). Such computers, processing devices, controllers, or control systems can for example control any of a variety of components or operations of any of a variety of such engines including, for example, timing or actuation of the compression and expansion devices (e.g., pistons or cylinders such as the piston 124 and cylinder 174), timing or actuation of the compression valves or power valves (e.g., valves 756 or 736 described above), opening or closing of the flow plate 214, control over combustion level (including combustion chamber pressure, temperature, etc.), control over the opening and closing of the LPD 235 and HPD 230 associated with the airlock 109 (and associated valves), and/or any one or more of numerous components of the engines.

One or more of the embodiments of new/improved internal combustion engines encompassed herein, such as one or more the embodiments described above, can offer any one or more advantages, depending upon the embodiment. For example, when compared to a boiler, gasifier, or other pre-use processing, one or more of the embodiments of the new/improved internal combustion engines encompassed herein may offer any of these benefits; simplicity, smaller size, lower cost, lower emissions, and safety.

Another advantage of at least one or more of the new/improved engines encompassed herein is the ability to use low cost fuel. When it is using wood or other biomass fuel, the operating carbon foot print of the engines can be zero. The process can be 100% recyclable and sustainable. In some embodiments, the engines may allow utilization of waste as fuel that may otherwise be land filled, which can provide an economic and ecological advantage. Further, as already discussed above, one or more of the embodiments encompassed herein are configured to use solid fuel—this in and of itself can be advantageous relative to engines that only utilize liquid or gaseous fuel insofar as solid fuel in at least some forms can be a more stable and/or easy-to-transport or store fuel than some liquid or gas fuels.

Additionally, at least some embodiments of the new/improved engines encompassed herein operate in an advantageous manner relative to one or more conventional engines that utilize solid fuel, insofar as at least some embodiments of the new/improved engines encompassed herein are able (for example, by using new/improved combustion chamber designs) to utilize one or more types of solid or slow burning fuel(s) directly (e.g., without employing a boiler or a converter to convert the fuel(s) into a liquid or gaseous form), and/or would produce less undesirable emissions by operating at lower peak temperatures. Also, in at least some embodiments encompassed herein, the efficiency of the new/improved engine does not decrease with an increase of power output since the combustion chamber pressure remains high.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. An internal combustion engine comprising:
   a crankshaft;
   a cylinder having a plurality of cylinder wall portions that define therewithin an internal cavity extending between a first internal end face of the first one of the cylinder wall portions and a second internal end face of a second one of the second cylinder wall portions;
   a piston positioned within the internal cavity of the cylinder, the piston including a piston head having a first side facing the first internal end face and a second side coupled at least indirectly to the crankshaft,
   wherein the cylinder includes first, second, third, and fourth ports formed respectively at first, second, third, and fourth locations along the plurality of cylinder wall portions along a part of the internal cavity positioned between the first internal end face and the first side face; and
   an assembly having a combustion chamber, an input port coupled at least indirectly to the first port, and an output port coupled at least indirectly to the second port, wherein the combustion chamber further includes a wall at least partly defining a first region of the combustion chamber within which solid fuel material is situated and combusted,
   wherein the assembly also includes first and second passageways therewithin, wherein the first passageway at least indirectly couples the input port with an input location of the first region, wherein the second passageway at least indirectly couples the input port with a second region in a manner that bypasses the first region, wherein the second region is at least indirectly coupled with each of an output location of the first region and the output port,
   wherein the assembly further includes a diverter valve so that, depending upon a setting of the diverter valve and during an operation of the internal combustion engine, a first amount of compressed air exiting the part of the internal cavity via the first port proceeds via the input port and the first passageway to the first region, a second amount of the compressed air proceeds via the second passageway so as to bypass the first region, and a combination of combustion products exiting the first region and the second amount of the compressed air proceeds via the output port and the second port to the part of the internal cavity, wherein the input port of the assembly is coupled to the first port at least indirectly by way of a first conduit, wherein the output port is coupled to the second port at least indirectly by way of a second conduit, wherein the first amount of compressed air proceeds to the first region additionally by way of the first conduit, and wherein the second amount of compressed air proceeds to the part of the internal cavity additionally via the second conduit, and wherein first conduit is configured to substantially surround the second conduit along at least a substantial portion of a distance between the cylinder and the combustion chamber, so that the first conduit can serve to at least partly cool the second conduit.

2. The internal combustion engine of claim 1 wherein, throughout a time period during which the engine experiences a plurality of operational cycles involving reciprocation of the piston within the cylinder, the combustion chamber experiences a combustion chamber pressure that is maintained constant at or substantially constant at a high value that is equivalent to or substantially equivalent to a compressed air pressure value of the compressed air exiting the part of the internal cavity.

3. The internal combustion engine of claim 2, wherein the solid fuel material experiences combustion within the first region of the combustion chamber continuously or substantially continuously throughout the time period.

4. The internal combustion engine of claim 3, further comprising means for transferring the solid fuel material into the first region of the combustion chamber, wherein the solid fuel material experiences the combustion chamber pressure.

5. The internal combustion engine of claim 4, further comprising means for keeping ash or solid material from flowing from the combustion chamber into the cylinder.

6. The internal combustion engine of claim 1, further comprising:
a third passageway that at least indirectly couples the second region with the output port, and wherein the combination of the combustion products and the second amount of compressed air proceeds to the part of the internal cavity additionally via the third passageway, and wherein the assembly includes a filter positioned in the second region or along the third passageway.

7. The internal combustion engine of claim 1,
wherein the diverter valve includes a flow plate, and wherein the setting of the flow plate depends upon a pressure within the combustion chamber, and wherein the assembly further includes a first internal liner and a second internal liner, wherein the first passageway is formed at least in part as a first space between the first internal liner and a combustion housing of the assembly, and wherein the second passageway is formed at least in part as a second space between the first and second internal liners.

8. The internal combustion engine of claim 1, wherein a first valve associated with the first port governs whether the compressed air can exit the internal cavity, and wherein a second valve associated with the second port governs whether the combination of the combustion products and the second amount of the compressed air can proceed into the internal cavity.

9. The internal combustion engine of claim 8, wherein a third valve associated with the third port governs whether air from an outside environment can enter the internal cavity via the third port, and wherein a fourth valve associated with the fourth port governs whether exhaust can exit the internal cavity via the fourth port.

10. The internal combustion engine of claim 9, wherein either:
each of the first and second valves is configured to be hydraulically-actuated; or
each of the first and second valves is configured so that the respective forces imparted upon the valves by the combustion chamber pressure tend to cause each of the respective valves to be or become closed.

* * * * *